(12) United States Patent
Liu et al.

(10) Patent No.: US 11,721,001 B2
(45) Date of Patent: Aug. 8, 2023

(54) MULTIPLE POINT SPREAD FUNCTION BASED IMAGE RECONSTRUCTION FOR A CAMERA BEHIND A DISPLAY

(71) Applicant: Samsung Electronics Company, Ltd., Gyeonggi-Do (KR)

(72) Inventors: Changgeng Liu, San Jose, CA (US); Ernest Rehmatulla Post, San Francisco, CA (US); Ziwen Jiang, Santa Clara, CA (US); Ye Zhao, Mountain View, CA (US); Gustavo A. Guayaquil Sosa, Sunnyvale, CA (US)

(73) Assignee: Samsung Electronics Co., Ltd., Suwon si (KR)

( * ) Notice: Subject to any disclaimer, the term of this patent is extended or adjusted under 35 U.S.C. 154(b) by 52 days.

(21) Appl. No.: 17/176,535

(22) Filed: Feb. 16, 2021

(65) Prior Publication Data

US 2022/0261966 A1 Aug. 18, 2022

(51) Int. Cl.
*G06T 5/00* (2006.01)
*G06T 7/571* (2017.01)
(Continued)

(52) U.S. Cl.
CPC ............... *G06T 5/003* (2013.01); *G06T 5/20* (2013.01); *G06T 5/50* (2013.01); *G06T 7/571* (2017.01);
(Continued)

(58) Field of Classification Search
CPC ........ G02B 27/0172; G02B 2027/0132; G02B 2027/0134; G02B 17/086; G02B 27/0101;
(Continued)

(56) References Cited

U.S. PATENT DOCUMENTS 3,971,065 A 7/1976 Bayer
6,454,414 B1 9/2002 Ting
(Continued)

FOREIGN PATENT DOCUMENTS

CN 101414094 A 4/2009
CN 112202991 A 1/2021
(Continued)

OTHER PUBLICATIONS

Oppo's under-screen camera is real and taking photos in Shanghai https://www.engadget.com/2019-06-26-oppo-under-screen-camera-mwc-shanghai.html, Downloaded from web Nov. 6, 2020.
(Continued)

*Primary Examiner* — Peter D Le

(57) ABSTRACT

A method includes capturing, by a camera disposed behind a display panel of an electronic device, an original image through a semi-transparent pixel region of the display panel, and determining a depth position with respect to at least one object identified within the original image. The method further includes accessing, based on the depth position, a plurality of point spread functions (PSFs) corresponding to a plurality of lateral positions at the depth position, and generating a set of image patches based on the plurality of PSFs. Each image patch of the set of image patches is generated based on a different one of the plurality of PSFs. The method concludes with generating a reconstructed image corresponding to the original image based on the set of image patches.

20 Claims, 23 Drawing Sheets

(51) Int. Cl.
- *G06T 5/20* (2006.01)
- *G06T 5/50* (2006.01)
- *H04N 9/73* (2023.01)
- *H04N 23/57* (2023.01)
- *H04N 23/80* (2023.01)

(52) U.S. Cl.
CPC .............. *H04N 9/73* (2013.01); *H04N 23/57* (2023.01); *H04N 23/80* (2023.01); *G06T 2207/10024* (2013.01); *G06T 2207/20221* (2013.01)

(58) Field of Classification Search
CPC ........... G02B 2027/011; G02B 27/106; G02B 30/22; G02B 2027/0145; G02B 2027/0127; G02B 2027/014; H04N 13/344; H04N 13/339; H04N 13/322; H04N 13/383; H04N 5/23222; H04N 5/247; H04N 5/217
See application file for complete search history.

(56) References Cited

U.S. PATENT DOCUMENTS

| | | | |
|---|---|---|---|
| 7,053,613 B2 | 5/2006 | Lin | |
| 8,041,142 B2 | 10/2011 | Schafer | |
| 8,433,152 B2* | 4/2013 | Watanabe | G06T 5/003 |
| | | | 382/255 |
| 8,582,911 B2 | 11/2013 | Kim | |
| 8,587,703 B2 | 11/2013 | Lelescu | |
| 9,220,481 B2 | 12/2015 | Park | |
| 9,338,354 B2 | 5/2016 | Hong | |
| 9,582,862 B2 | 2/2017 | Zhang | |
| 9,654,707 B2 | 5/2017 | Oniki | |
| 9,911,208 B2 | 3/2018 | Zhou | |
| 9,916,656 B2 | 3/2018 | Choi | |
| 9,947,901 B2 | 4/2018 | Shedletsky | |
| 9,948,849 B2 | 4/2018 | Kim | |
| 10,032,254 B2 | 7/2018 | Harmeling | |
| 10,062,153 B2 | 8/2018 | Oniki | |
| 10,083,335 B2 | 9/2018 | Zhang | |
| 10,178,381 B2* | 1/2019 | Hall | G06T 5/003 |
| 10,191,577 B2 | 1/2019 | Choi | |
| 10,217,190 B2 | 2/2019 | Liu | |
| 10,416,087 B2 | 9/2019 | Zhang | |
| 10,595,724 B2* | 3/2020 | Lai | G02B 7/04 |
| 10,642,059 B2 | 5/2020 | Soskind | |
| 10,656,437 B2 | 5/2020 | Limon | |
| 11,003,088 B2 | 5/2021 | Sorg | |
| 11,038,143 B2 | 6/2021 | Moon | |
| 11,073,712 B2 | 7/2021 | Yeke Yazdandoost | |
| 11,272,106 B1 | 3/2022 | Lee | |
| 2003/0002746 A1 | 1/2003 | Kusaka | |
| 2006/0103951 A1* | 5/2006 | Bell | G02B 27/46 |
| | | | 359/737 |
| 2006/0256226 A1* | 11/2006 | Alon | H04N 5/367 |
| | | | 348/E5.079 |
| 2008/0013850 A1* | 1/2008 | Sakurai | H04N 5/23267 |
| | | | 382/162 |
| 2008/0068660 A1 | 3/2008 | Lace | |
| 2008/0165261 A1 | 7/2008 | Kamo | |
| 2008/0166115 A1* | 7/2008 | Sachs | H04N 5/23248 |
| | | | 396/55 |
| 2008/0218597 A1 | 9/2008 | Cho | |
| 2008/0292135 A1 | 11/2008 | Schafer | |
| 2009/0147111 A1 | 6/2009 | Litvinov | |
| 2009/0263043 A1 | 10/2009 | Cristobal | |
| 2010/0073518 A1* | 3/2010 | Yeh | H04N 5/23293 |
| | | | 382/106 |
| 2010/0188528 A1 | 7/2010 | Iwata | |
| 2011/0019056 A1* | 1/2011 | Hirsch | H04N 5/2226 |
| | | | 348/333.01 |
| 2011/0075257 A1* | 3/2011 | Hua | G02B 26/004 |
| | | | 359/464 |
| 2011/0221888 A1* | 9/2011 | Choi | G01C 3/08 |
| | | | 348/E5.025 |
| 2011/0285680 A1* | 11/2011 | Nakamura | H04N 7/144 |
| | | | 345/207 |
| 2012/0057072 A1* | 3/2012 | Yamashita | H04N 23/673 |
| | | | 348/E5.045 |
| 2012/0162490 A1 | 6/2012 | Chung | |
| 2013/0010077 A1* | 1/2013 | Nguyen | H04N 13/271 |
| | | | 348/46 |
| 2013/0147778 A1* | 6/2013 | Ninan | G09G 3/3426 |
| | | | 345/207 |
| 2013/0182062 A1* | 7/2013 | Son | H04N 7/14 |
| | | | 348/14.07 |
| 2013/0308007 A1 | 11/2013 | Tanaka | |
| 2013/0321686 A1* | 12/2013 | Tan | H04N 7/144 |
| | | | 348/E5.022 |
| 2013/0336597 A1 | 12/2013 | Maeda | |
| 2014/0044314 A1* | 2/2014 | Sezer | G06T 7/571 |
| | | | 382/106 |
| 2015/0049165 A1* | 2/2015 | Choi | H04N 7/144 |
| | | | 348/14.16 |
| 2015/0207962 A1* | 7/2015 | Sugimoto | G06T 3/4023 |
| | | | 382/261 |
| 2016/0180510 A1* | 6/2016 | Grau | G06T 7/80 |
| | | | 348/46 |
| 2016/0248975 A1* | 8/2016 | Choi | H04N 5/23293 |
| 2016/0277658 A1 | 9/2016 | Kim | |
| 2016/0371821 A1* | 12/2016 | Hayashi | H04N 1/4092 |
| 2017/0076430 A1 | 3/2017 | Xu | |
| 2017/0104897 A1 | 4/2017 | Kang | |
| 2017/0212613 A1 | 7/2017 | Hwang | |
| 2017/0316552 A1 | 11/2017 | Hanocka | |
| 2018/0038768 A1* | 2/2018 | Hofmann | G01M 11/0228 |
| 2018/0116500 A1* | 5/2018 | Escalier | A61B 3/036 |
| 2018/0129061 A1* | 5/2018 | Shinohara | G02B 6/0031 |
| 2018/0198980 A1 | 7/2018 | Takagi | |
| 2018/0211420 A1 | 7/2018 | Yoo | |
| 2019/0212544 A1 | 7/2019 | Heber | |
| 2019/0213717 A1 | 7/2019 | Oniki | |
| 2019/0327417 A1 | 10/2019 | Moriuchi | |
| 2019/0355101 A1* | 11/2019 | Chen | H04N 5/35721 |
| 2020/0166807 A1* | 5/2020 | Sasaki | G02F 1/133606 |
| 2020/0169725 A1* | 5/2020 | Hua | G02B 27/0101 |
| 2020/0209604 A1 | 7/2020 | Chen | |
| 2020/0321561 A1 | 10/2020 | Park | |
| 2020/0389575 A1 | 12/2020 | Gove | |
| 2020/0394964 A1 | 12/2020 | Hyun | |
| 2021/0029336 A1 | 1/2021 | Liu | |
| 2021/0152735 A1* | 5/2021 | Zhou | G06T 5/50 |
| 2021/0193756 A1 | 6/2021 | Oh | |
| 2021/0199952 A1* | 7/2021 | Cho | G02B 5/208 |
| 2021/0210533 A1 | 7/2021 | Cho | |
| 2021/0233976 A1 | 7/2021 | Lee | |
| 2022/0067889 A1 | 3/2022 | Kang | |
| 2022/0138924 A1 | 5/2022 | Kwon | |
| 2022/0292637 A1* | 9/2022 | Huang | G06T 3/4053 |

FOREIGN PATENT DOCUMENTS

| | | |
|---|---|---|
| CN | 108335268 B | 9/2021 |
| CN | 114331886 A | 4/2022 |
| CN | 110675347 B | 5/2022 |
| JP | 2008-070566 A | 3/2008 |
| KR | 101894391 B1 | 9/2018 |
| KR | 10-2022-0014764 A | 2/2022 |
| WO | WO 2010081229 A1 | 7/2010 |
| WO | WO 2016-154392 A1 | 9/2016 |
| WO | WO 2017117152 A1 | 7/2017 |
| WO | WO 2021/122471 A1 | 6/2021 |
| WO | WO 2022-005157 A1 | 1/2022 |

OTHER PUBLICATIONS

PCT Search Report and Written Decision in PCT/KR2022/001920, dated May 13, 2022.
Levin, A. et al., "Image and Depth from a Conventional Camera with a Coded Aperture," ACM Transactions on Graphics, vol. 26,

(56) References Cited

OTHER PUBLICATIONS

No. 3, Article 70, Publication date Jul. 2007, DOI 10.1145/1239451.1239521, http://doi.acm.org/10.1145/1239451.1239521, 9 pgs.

Hong, J., et al., "Three-dimensional display technologies of recent interest: principles, status, and issues [Invited]," (Doc. ID 152226), Applied Optics, vol. 50, No. 34, , Dec. 1, 2011, https://www.researchgate.net/publication/51919272, DOI: 10.1364/AO.50.000H87, 0003-6935/11/340H87, © 2011 Optical Society of America, pp. H87-H115 (30 pages).

Ren, Ng, "Digital light field photography," PhD dissertation, Stanford University, Jul. 2006, 203 pgs.

Qin, Zong, et al., "See-Through Image Blurring of Transparent Organic Light-Emitting Diodes Display: Calculation Method Based on Diffraction and Analysis of Pixel Structures," Journal of Display Technology, vol. 12, No. 11, Nov. 2016, Digital Object Identifier 10.1109/JDT.2016.2594815, 1551-319X © 2016 IEEE, pp. 1242-1249 (9 pgs).

Richardson, William Hadley, "Bayesian-Based Iterative Method of Image Restoration," Journal of Optical Society of America, vol. 62, No. 1, Jan. 1972, pp. 55-59 (5 pgs).

Lucy, L. B., "An Iterative Technique for the Rectification of Observed Distributions," The Astronomical Journal, vol. 79, No. 6, Jun. 1974, © American Astronomical Society, provided by the NASA Astrophysics Data System, pp. 745-754 (10 pgs).

Heide, Felix, et al., "ProxImaL: Efficient Image Optimization Using Proximal Algorithms," SIGGRAPH 16 Technical paper, Jul. 24-28, 2016, Anaheim, CA. SIGGRAPH '16 Technical Paper, Jul. 24-28, 2016, Anaheim, CA, ISBN: 978-1-4503-4279-7/16/07 DOI: http://dx.doi.org/10.1145/2897824.2925875, 15 pages.

Sitzmann, Vincent., et al., "End-to-End Optimization of Optics and Image Processing for Achromatic Extended Depth of Field and Super-Resolution Imaging," © 2018 ACM 0730-0301/2018/8-ART114, https://doi.org/10.1145/3197517.3201333, ACM Transactions on Graphics vol. 37, No. 4, Article 114, Publication Aug. 2018, pp. 114:1-114:13 (13 pgs.).

International Search Report and Written Opinion for International App. No. PCT/KR2020/009807, dated Oct. 26, 2020.

European Search Report in EP 20846484.2, dated Mar. 14, 2022.

Non-Final Office Action in U.S. Appl. No. 16/935,946, dated Apr. 5, 2022.

Notice of Allowance in U.S. Appl. No. 16/935,946, dated Jul. 6, 2022.

Yang, Hang, Zhongbo Zhang, and Yujing Guan. "An adaptive parameter estimation for guided filter based image deconvolution." *Signal Processing* 138 (Mar. 7, 2017): 16-26.

Youmaran, R., and A. Adler. "Combining regularization frameworks for image deblurring: optimization of combined hyper-parameters." In *Canadian Conference on Electrical and Computer Engineering 2004 (IEEE Cat. No. 04CH37513)*, vol. 2, pp. 723-726. IEEE, May 2, 2004.

Non-Final Office Action in U.S. Appl. No. 17/380,995, dated Jun. 22, 2022.

PCT Search Report and written decision in PCT/KR2022/001024, dated May 10, 2022.

Image Restoration for Under-Display Camera, Yuqian Zhou et al., CVPR 2021, accessed on Oct. 25, 2022 at https://openaccess.thecvf.com/CVPR2021?day=all.

Notice of Allowance in U.S. Appl. No. 17/380,995, dated Dec. 21, 2022.

Anqi Yang et al., 'Designing Display Pixel Layouts for Under-Panel Cameras', IEEE Transactions on Pattern Analysis and Machine Intelligence, vol. 43, No. 7, pp. 2245-2256, Apr. 27, 2021.

PCT Search Report and Written Decision in PCT/KR2022/011598, dated Nov. 16, 2022.

PCT Search Report and Written Opinion in PCT/KR2022/015641.

\* cited by examiner

FIG. 8
| Zo(mm) | Region # | Set of PSFs |
|---|---|---|
| (280, 320] | 1 | at zo1=300mm |
| (320, 380] | 2 | at zo2=350mm |
| (380, 460] | 3 | at zo3=420mm |
Look-up table for actual zo range versus PSF selection
FIG. 9
| Zo(mm) | Region # | Center position where PSFs are recorded |
|---|---|---|
| (280, 320] | 1 | 300mm |
| (320, 380] | 2 | 350mm |
| (380, 460] | 3 | 420mm |
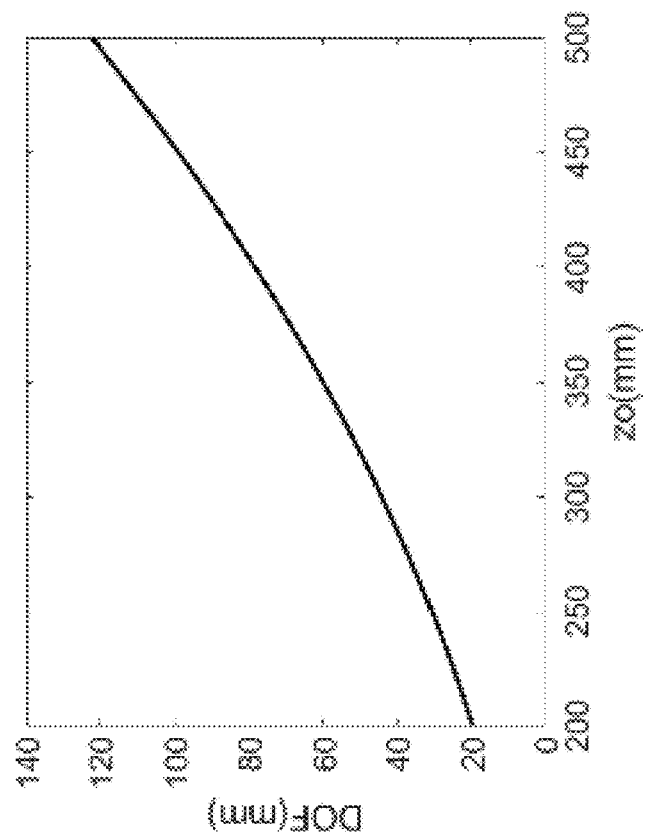
FIG. 7

6 PSFs recording at 6 different lateral positions at zo=350mm

FIG. 16 Image without display in place

Image blurred by the display

Image obtained by stitching 35 reconstructed patches

Image obtained using only 1 PSF patch for entire image

US 11,721,001 B2

MULTIPLE POINT SPREAD FUNCTION BASED IMAGE RECONSTRUCTION FOR A CAMERA BEHIND A DISPLAY

TECHNICAL FIELD

This disclosure relates generally to electronic displays, and, more particularly, to the multiple point spread function (PSF) based reconstruction of images captured by a camera behind the electronic displays.

BACKGROUND

Electronic displays, such as active matrix liquid crystal displays (AMLCDs), active matrix organic light emitting displays (AMOLEDs), and micro-LED displays are typically the types of the displays that are deployed for use in personal electronic devices (e.g., mobile phones, tablet computers, smartwatches, and so forth). Such personal electronic devices may generally include a front-facing camera, which may be disposed adjacent to the display, and may be utilized most often by users to capture self-portraits (e.g., "selfies"). However, as front-facing camera systems grow in complexity (e.g., depth cameras), more and more of the area designated for the display of the electronic device may be traded off to expand the area designated for the camera system. This may lead to a reduction in resolution and viewing area of the display. One technique to overcome the reduction in resolution and viewing area of the display may be to dispose the front-facing camera system completely behind or underneath the display panel. However, disposing the front-facing camera system behind the display panel may often degrade images captured by the front-facing camera. It may be thus useful to provide improved techniques to reconstruct images captured by front-facing camera systems disposed behind a display panel.

BRIEF DESCRIPTION OF THE DRAWINGS

FIG. 7, FIG. 8, and FIG. 9 illustrate charts including example experimental data.

DESCRIPTION OF EXAMPLE EMBODIMENTS

Figure 1A:
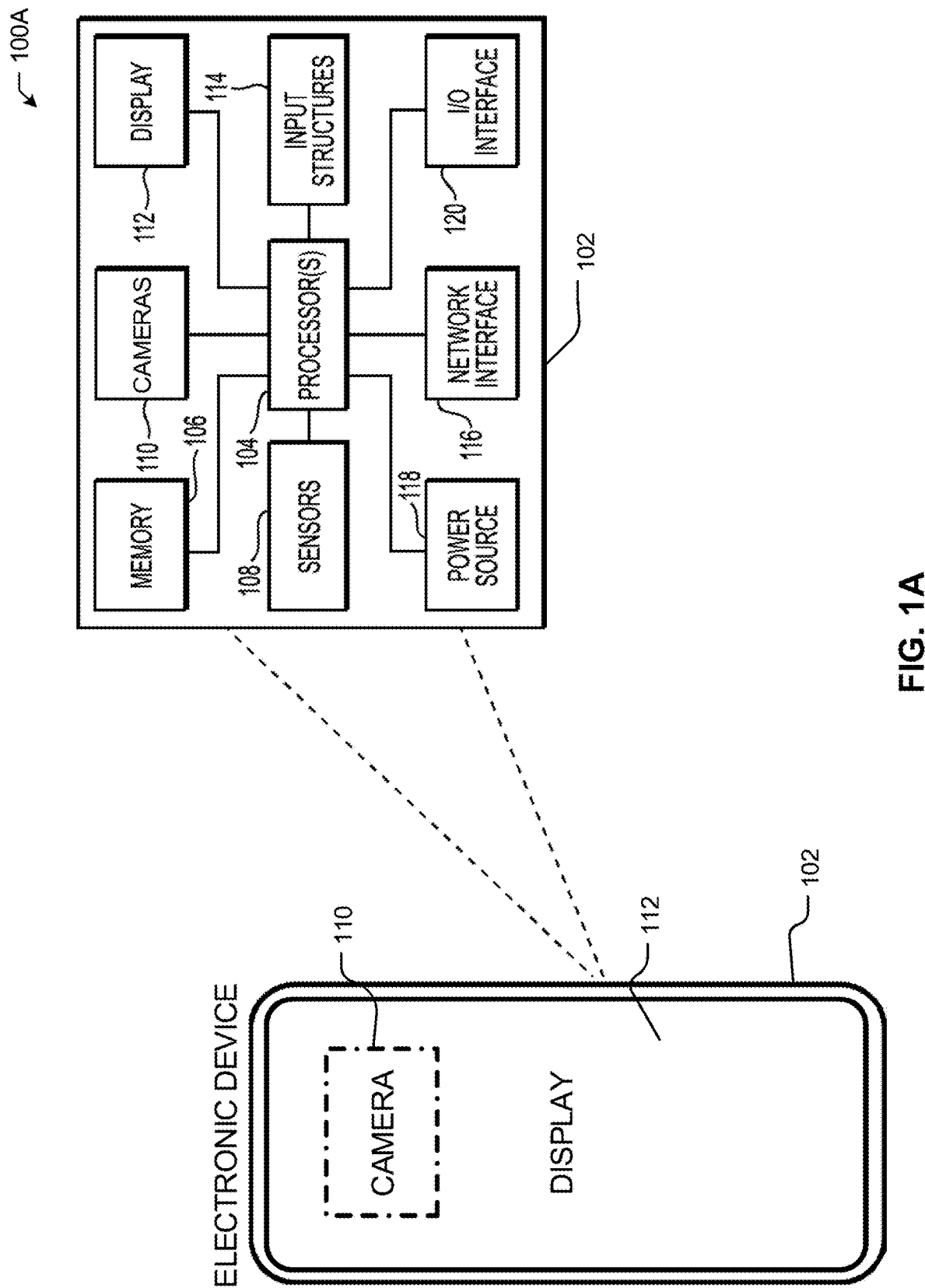
FIG. 1A illustrates an example diagram of an electronic device.

The present embodiments are directed toward techniques for reconstructing images captured by a camera disposed behind a display of an electronic device based on multiple PSFs captured at a particular depth and differing lateral positions. In particular embodiments, the electronic device may capture, by a camera disposed behind a display panel of the electronic device, an original image through a semi-transparent (or transparent, partially transparent, etc.) region of the display panel. In particular embodiments, the original image may include a number of color components, and more specifically red (R) color components, green (G) color components, and blue (B) color components. In particular embodiments, the camera may determine the bit depth of the original image. For example, in particular embodiments, the original image may include a bit depth N=10, which incorporates various color components. In particular embodiments, other values for the bit depth are possible (e.g., N=2, N=8, or N=12, and so forth). In particular embodiments, the electronic device may then determine a depth position with respect to at least one object identified within the original image. For example, in particular embodiments, the electronic device may determine the depth position with respect to at least one object by calculating the depth position based on a determined focal length of the camera.

In particular embodiments, the electronic device may then access, based on the depth position, a number of point spread functions (PSFs) corresponding to a number of lateral positions at the depth position. For example, in particular embodiments, the electronic device may access the number of PSFs by selecting, from a memory of the electronic device, a number of premeasured PSFs corresponding to the number of lateral positions, respectively. In particular embodiments, the electronic device may then generate a set of image patches based on the number of PSFs, in which each image patch of the set of image patches is generated based on a different one of the number of PSFs. For example, in particular embodiments, the electronic device may generate the set of image patches based on the number of PSFs by generating a subset of image patches for each color component of the number of color components.

In particular embodiments, the electronic device may then generate a reconstructed image corresponding to the original image based on the set of image patches. For example, in particular embodiments, the electronic device may generate the reconstructed image by deconvolving each image patch of the subset of image patches for each color component of the number of color components. In particular embodiments, the electronic device may further generate the reconstructed image by stitching together the subset of image patches for each color component of the number of color components. In particular embodiments, the electronic device may further generate the reconstructed image performing a filtering of the stitched subset of image patches for each color component of the number of color components, and performing a color balancing and correction of the stitched subset of image patches for each color component of the number of color components.

In this way, the present embodiments may increase the viewing area and the resolution of the display of the electronic device by disposing one or more front-facing cameras of the electronic device behind the display. For example, because of the increase in display area (e.g., having eliminated the display area typically designated for the one or more front-facing cameras), the electronic device may further provide for improved graphical user interfaces (GUI) with a full screen view in its entirety, as opposed to limited to only displaying battery status, cellular signal strength data, Wi-Fi status, time info, and so forth, in line with a notch design or hole-punch design. The present techniques may further increase an aesthetic quality of the electronic device, as well as allow a user of the electronic device to display higher resolution images on the display of the electronic device. Still further, because the one or more front-facing cameras may be placed behind the display, the present techniques may allow the one or more front-facing cameras to be placed anywhere (e.g., in a center area of the display), as opposed to in a corner or along an edge of the display of the electronic device. This may provide an improved user experience and/or GUI, such as by directing a user taking a selfie to gaze at the center area of the display and further by giving the impression of eye-to-eye contact with another user when the user is participating in a video-conference, a videotelephonic exchange, or other video-streaming service.

Furthermore, it should be appreciated that while the present embodiments are described primarily with respect to reconstructing images captured by a camera disposed behind a display of an electronic device based on multiple PSFs captured at a particular depth and differing lateral positions, the present embodiments further contemplate reconstructing images based on multiple PSFs captured at a particular depth and differing lateral positions utilizing any suitable arrangements of cameras, light sources, and so forth. As such, the present embodiments as described herein may be used for reconstructing images based on multiple PSFs captured at a particular depth and differing lateral positions in any system where images captured by the system may be distorted (e.g., blurred) due to, for example, an object depth position relative to the camera lens being unknown beforehand and the associated PSFs being different for each of various differing lateral positions with respect to a particular object depth position. For example, in addition to a camera disposed behind a display panel, the particular embodiments may equally apply to applications in which, for example, an image is captured through micro-perforations utilizing a concealed camera and/or utilizing an inverse filter to generate a higher-quality image than that achievable by less advanced optical devices.

FIG. 1A illustrates an example diagram 100A of an electronic device 102. In particular embodiments, the electronic device 102 may include, for example, any of various personal electronic devices 102, such as a mobile phone electronic device, a tablet computer electronic device, a laptop computer electronic device, and so forth. In particular embodiments, as further depicted by FIG. 1, the personal electronic device 102 may include, among other things, one or more processor(s) 104, memory 106, sensors 108, cameras 110, a display panel 112, input structures 114, network interfaces 116, a power source 118, and an input/output (I/O) interface 120. It should be noted that FIG. 1 is merely one example of a particular implementation and is intended to illustrate the types of components that may be included as part of the electronic device 102.

In particular embodiments, the one or more processor(s) 104 may be operably coupled with the memory 106 to perform various algorithms for providing interactive music conducting and composing activity through intelligence-based learning progression. Such programs or instructions executed by the processor(s) 104 may be stored in any suitable article of manufacture that includes one or more tangible, computer-readable media at least collectively storing the instructions or routines, such as the memory 106. The memory 106 may include any suitable articles of manufacture for storing data and executable instructions, such as random-access memory (RAM), read-only memory (ROM), rewritable flash memory, hard drives, and so forth. Also, programs (e.g., an operating system) encoded on such a computer program product may also include instructions that may be executed by the processor(s) 104 to enable the electronic device 102 to provide various functionalities.

In particular embodiments, the sensors 108 may include, for example, one or more cameras (e.g., depth cameras), touch sensors, microphones, motion detection sensors, thermal detection sensors, light detection sensors, time of flight (ToF) sensors, ultrasonic sensors, infrared sensors, or other similar sensors that may be utilized to detect various user inputs (e.g., user voice inputs, user gesture inputs, user touch inputs, user instrument inputs, user motion inputs, and so forth). The cameras 110 may include any number of cameras (e.g., wide cameras, narrow cameras, telephoto cameras, ultra-wide cameras, depth cameras, and so forth) that may be utilized to capture various 2D and 3D images. The display panel 112 may include any display architecture (e.g., AMLCD, AMOLED, micro-LED, and so forth), which may provide further means by which users may interact and engage with the electronic device 102. In particular embodiments, as further illustrated by FIG. 1, one more of the cameras 110 may be disposed behind or underneath (e.g., as indicated by the dashed lines of electronic device 102) the display panel 112 (e.g., one or more of the cameras 110 may be completely concealed by the display panel 112), and thus the display panel 112 may include a transparent pixel region and/or semi-transparent pixel region through which the one or more concealed cameras 110 may detect light, and, by extension, capture images. It should be appreciated that the one more of the cameras 110 may be disposed anywhere behind or underneath the display panel 112, such as at a center area behind the display panel 112, at an upper area behind the display panel 112, or at a lower area behind the display panel 112.

In particular embodiments, the input structures 114 may include any physical structures utilized to control one or more global functions of the electronic device 102 (e.g., pressing a button to power "ON" or power "OFF" the electronic device 102). The network interface 116 may include, for example, any number of network interfaces suitable for allowing the electronic device 102 to access and receive data over one or more cloud-based networks (e.g., a cloud-based service that may service hundreds or thousands of the electronic device 102 and the associated users corresponding thereto) and/or distributed networks. The power source 118 may include any suitable source of power, such as a rechargeable lithium polymer (Li-poly) battery and/or an alternating current (AC) power converter that may be utilized to power and/or charge the electronic device 102 for operation. Similarly, the I/O interface 120 may be provided to allow the electronic device 102 to interface with various other electronic or computing devices, such as one or more auxiliary electronic devices.

Figure 1B:
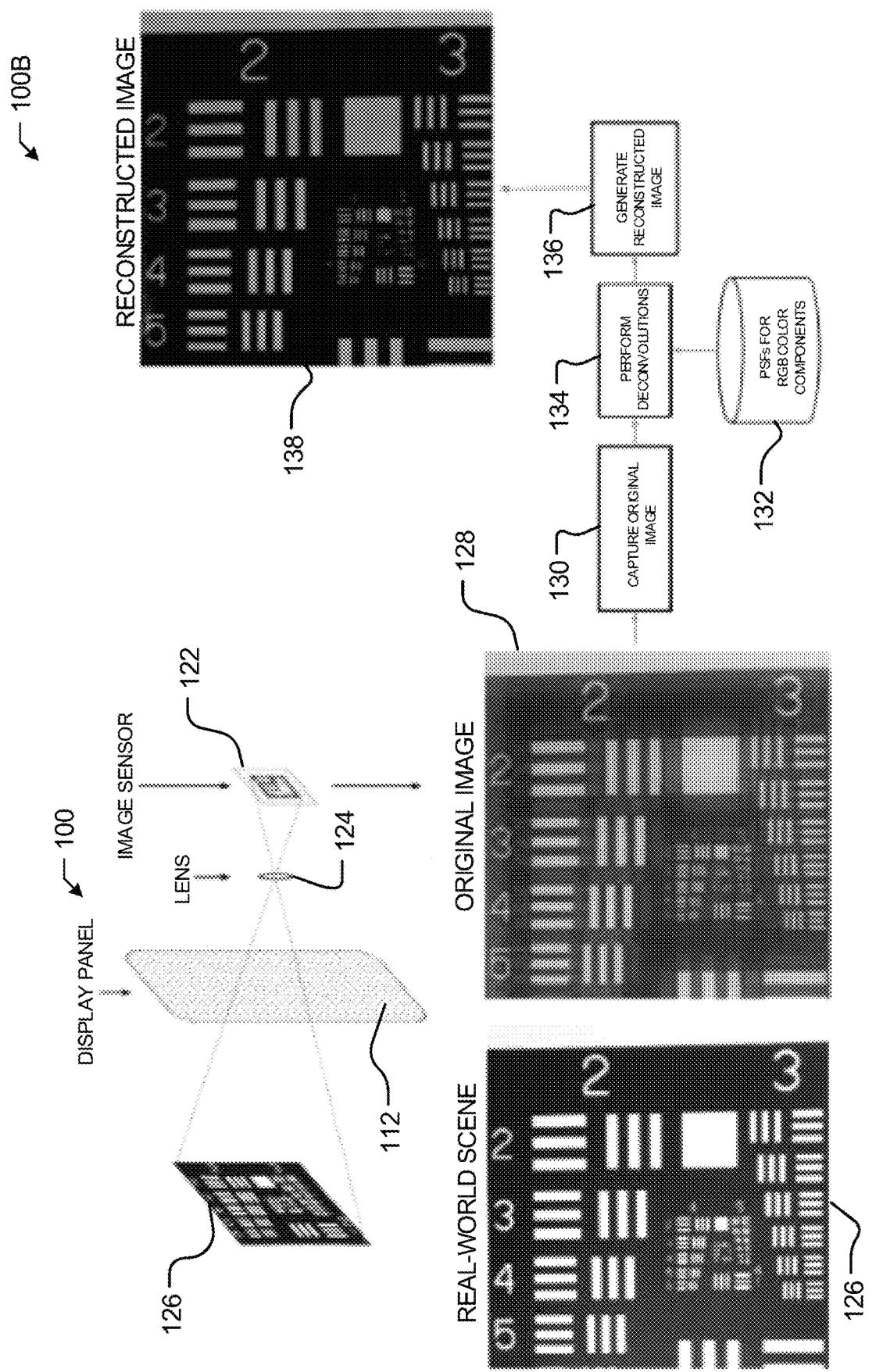
FIG. 1B illustrates an example system and workflow diagram for reconstructing images captured by a camera disposed behind a display of an electronic device.

FIG. 1B illustrates an example system and workflow diagram 100B for reconstructing images captured by a camera disposed behind a display of an electronic device, in accordance with the presently disclosed embodiments. In particular embodiments, the electronic device 102 may capture, by an image sensor 122 and camera lens 124 disposed behind a display panel 112 of the electronic device 102, an image of a real-world scene 126. In particular embodiments, the image of the real-world scene 126 captured by the image sensor 122 may correspond to an original image 128. In particular embodiments, based on the image of the real-world scene 126 being captured by the image sensor 122 through the display panel 112, the original image 128 may be degraded (e.g., blurred or distorted). In particular embodiments, after performing (at functional block 130) the capturing of the original image 128, the electronic device 102 may retrieve, for one or more pixel regions of the original image 128, the PSFs (e.g., a function of 3D diffraction pattern of light emitted from an imperceptibly small point light source and captured by one or more image sensors 122) for each of the RGB color components of the original image 128. In particular embodiments, that may be stored on the electronic device 102. In particular embodiments, the electronic device 102 may determine the respective PSF for each of the RGB color components by selecting (at functional block 132), from the memory 106 of the electronic device 102, the premeasured PSFs for each of the RGB color components. In particular embodiments, the electronic device 102 may determine multiple PSFs in various pixel regions of the real-world scene 126 to capture the PSFs' variation with the angle of incidence to the optical axis of the display panel 112, for example.

In particular embodiments, electronic device 102 may then perform (at functional block 134), for the number of pixel regions of the original image 128, a deconvolution of each of the RGB color components of the original image 128 based on their respective PSFs. In particular embodiments, the electronic device 102 may perform the deconvolution of each of the RGB color components by performing a Richardson-Lucy deconvolution of each of the RGB color components or by performing a Tikhonov regularized inverse filter deconvolution of each of the RGB color components. In particular embodiments, other deconvolution techniques may be utilized. In particular embodiments, the electronic device 102 may then generate (at functional block 136) a reconstructed image 138 corresponding to the original image 128 based on the deconvolutions of each of the RGB color components. As illustrated by comparison of the original image 128 to the reconstructed image 138, the electronic device 102 may generally generate the reconstructed image 138 by removing a blurring effect of the original image 128.

Figure 2:
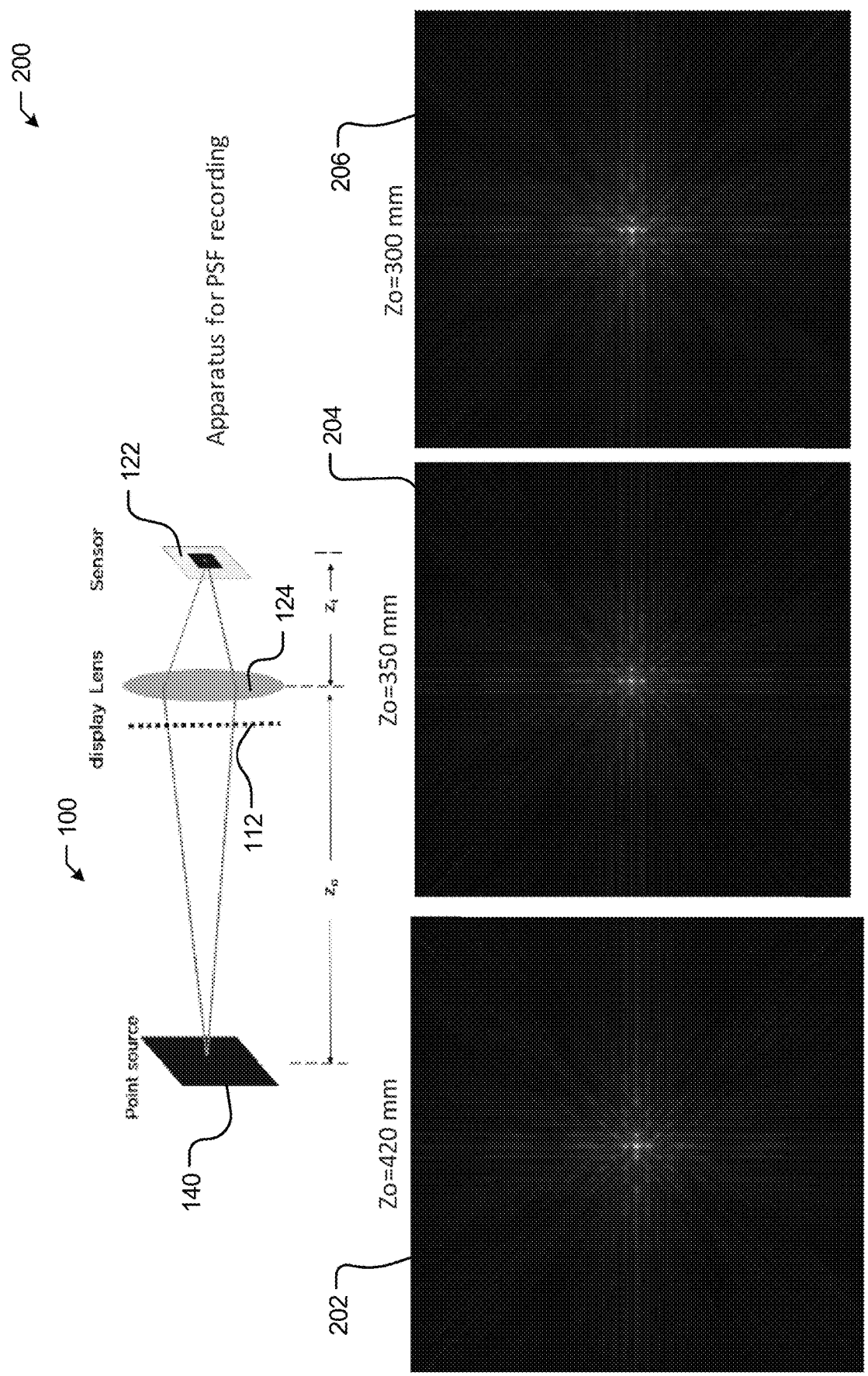
FIG. 2 illustrates an example system for measuring and determining one or more premeasured PSFs.

FIG. 2 illustrates an example system 200 for measuring and determining one or more premeasured point spread functions (PSFs) (e.g., individually for each of the RGB color components and/or one or more particular monochromatic color components) of an electronic device, in accordance with the presently disclosed embodiments. For example, the example system 200 may be utilized for measuring and determining a number of PSFs. In particular embodiments, to reconstruct a degraded original image, the electronic device 102 may premeasure (e.g., determine experimentally during a calibration process and/or manufacturing process of the electronic device 102) and store the PSFs of the electronic device 102. In particular embodiments, as depicted by FIG. 2, point light source 140 (e.g., a white LED or an array of white LEDs) may emit a light wave into the direction of the electronic device 102 through, for example, a pinhole or other imperceptibly small aperture. In particular embodiments, the light wave may pass through, for example, the display panel 112 and the camera lens 124, and may be ultimately detected by the image sensor 122. In particular embodiments, the electronic device 102 may then premeasure the one or more PSFs for each of the RGB color components and/or one or more particular monochromatic color components based on, for example, a sampling of a transfer function corresponding to the display panel 112 in response to the point light source 140.

Figure 3:
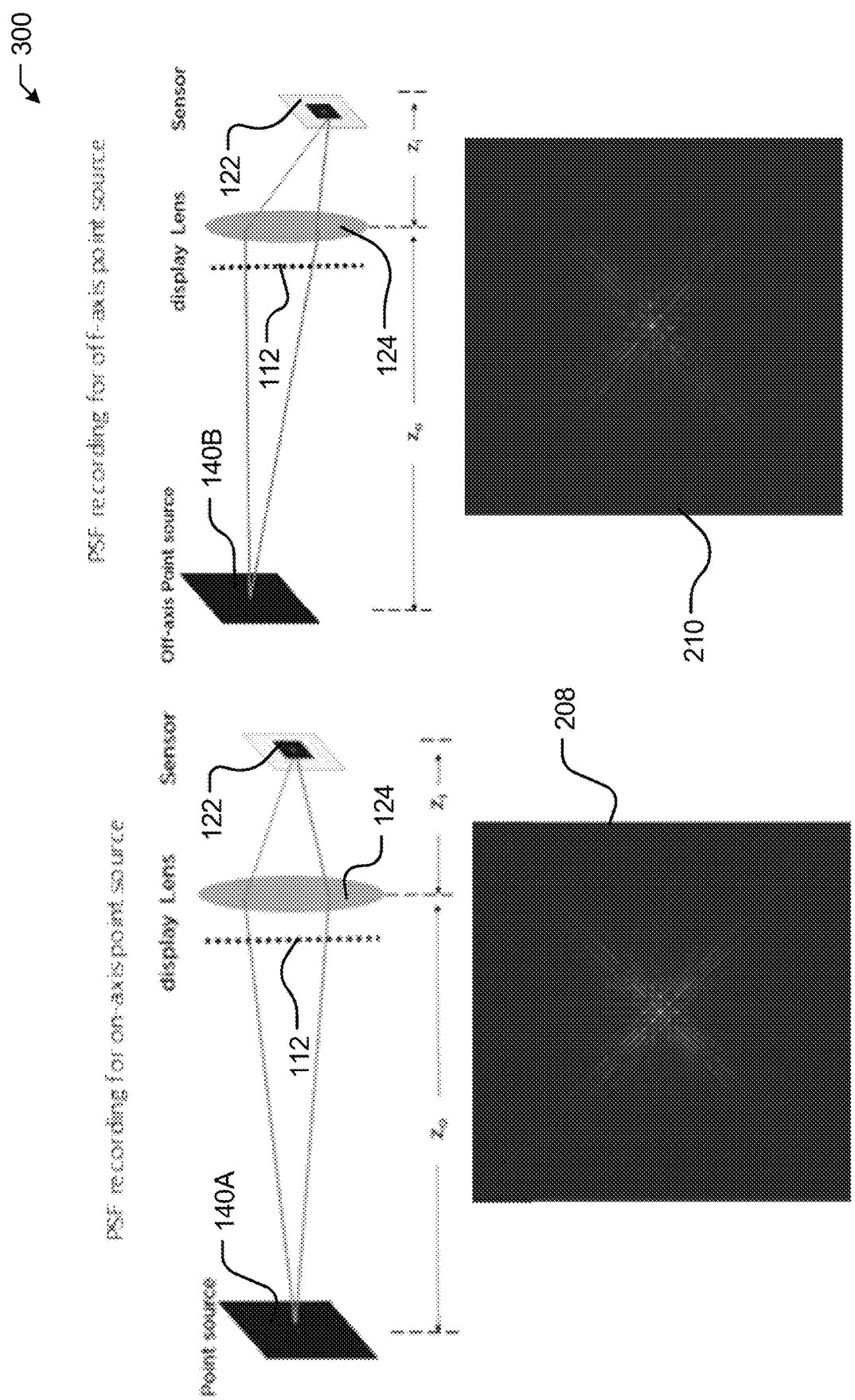
FIG. 3 illustrates another example system for measuring and determining one or more premeasured PSFs.

FIG. 3 illustrates another example system 300 for measuring and determining one or more premeasured PSFs utilizing on-axis point light source 140A and off-axis point light source 140B, respectively. In accordance with particular embodiments, PSFs measured at different depth positions may include different measured values, as well as PSFs measured at different lateral positions may each include different measured values. For example, as depicted by FIG. 2 and FIG. 3, respectively, PSFs 202, 204, and 206 measured at different depth positions (e.g., $Z_0$=420 millimeters, $Z_0$=350 mm, $Z_0$=300 mm) may include different measured values, as well as PSFs 208 and 210 measured at different lateral positions (e.g., $(X_1,Y_1,Z_0)(X_2,Y_2,Z_0)$) may include different measured values. For example, as illustrated by the example system 200, when capturing an image of a real-world scene, the object depth position relative to the camera lens 124 may be unknown beforehand. Thus, to properly perform the image reconstruction utilizing techniques discussed above with respect to FIG. 1B, the suitable PSF at the correct axial position with respect to the object of interest being captured would first have to be determined. Otherwise, in accordance with particular embodiments, the blurred original image 128 may not be reconstructed in a manner that would completely remove the blurring artifacts. Thus, in accordance the presently disclosed embodiments, it may be useful to determine the correct axial depth position and then determine multiple PSFs at the axial depth position (e.g., multiple PSFs at a single axial depth position $Z_0$, but at multiple different lateral positions (e.g., $(X_1,Y_1,Z_0)(X_2,Y_2,Z_0)$) may be measured to compensate for the fact that PSFs measured at different lateral positions (e.g., $(X_1,Y_1,Z_0)(X_2,Y_2,Z_0)$) may each include a different measured value. Accordingly, as will be discussed in greater detail below, it may be thus useful to provide techniques for reconstructing images captured by the camera 110 disposed behind the display panel 112 based on multiple PSFs captured at a particular depth and different lateral positions (e.g., $(X_1,Y_1,Z_0)(X_2,Y_2,Z_0)$).

Figure 4:
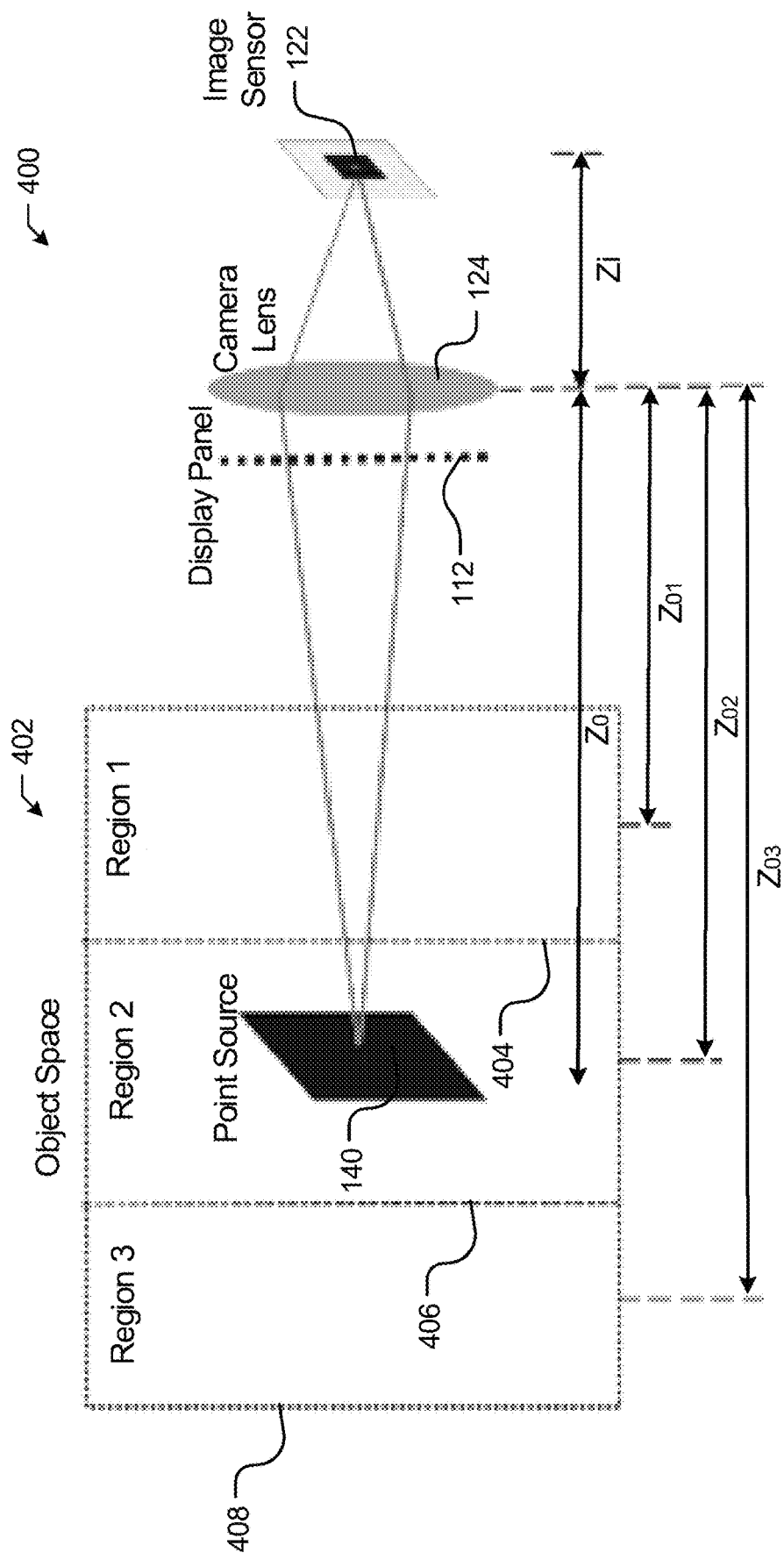
FIG. 4 illustrates an example system for reconstructing images based on multiple PSFs captured at a particular depth position and differing lateral positions.

FIG. 4 illustrates an example system 400 for reconstructing images based on multiple PSFs (e.g., individually for each of the RGB color components and/or one or more particular monochromatic color components) captured at a particular depth position and differing lateral positions, in accordance with the presently disclosed embodiments. For example, the example system 400 may be utilized as the basis for measuring and determining one or more PSFs. In particular embodiments, as generally depicted by FIG. 4, the point light source 140 (e.g., a white LED or an array of white LEDs) may emit a light wave into the direction of the electronic device 102 through, for example, a pinhole or other imperceptibly small aperture. In particular embodiments, the light wave may pass through, for example, the display panel 112 and the camera lens 124, and may be ultimately detected by the image sensor 122. In particular embodiments, as depicted in FIG. 4, an axial depth position $Z_0$ may be determined for a particular object of interest (e.g., point light source 140) that may be positioned within a 3D object space 402. In particular embodiments, the determined axial depth position $Z_0$ may be calculated utilizing infrared (IR) light and/or structured light and or more depth cameras that may capture the point light source 140 apart from the electronic device 102 and/or by way of the electronic device 102. In particular embodiments, the determined axial depth position $Z_0$ may also be estimated based on the physical experimental setup of the example system 400.

In particular embodiments, once the axial depth position $Z_0$ is determined, a number of PSFs may be measured at a number of different lateral positions $(X_1,Y_1,Z_0)(X_2,Y_2,Z_0)$ at the determined axial depth position $Z_0$. In particular embodiments, the different lateral positions $(X_1,Y_1,Z_0)(X_2,Y_2,Z_0)$ may be located at the determined axial depth position $Z_0$ and may be defined laterally with respect to the 3D object space 402. For example, in particular embodiments, a first region 404 (e.g., "Region 1") may be defined laterally with respect to the 3D object space 402 and may correspond to a lateral position value of $Z_{01}$, a second region 406 (e.g., "Region 2") may be defined laterally with respect to the 3D object space 402 and may correspond to a lateral position value of $Z_{02}$, and a third region 408 (e.g., "Region 3") may be defined laterally with respect to the 3D object space 402 and may correspond to a lateral position value of $Z_{03}$. In particular embodiments, the first region 404 (e.g., "Region 1") corresponding to the lateral position value of $Z_{01}$, the second region 406 (e.g., "Region 2") corresponding to the lateral position value of $Z_{02}$, and the third region 408 (e.g., "Region 3") corresponding to the lateral position value of $Z_{03}$ may each correspond to a respective subregion of pixels (e.g., patch of pixels), such that the respective measured PSFs corresponding to the differing lateral positions $(X_1,Y_1,Z_0)$, $(X_2,Y_2,Z_0)$, and $(X_3,Y_3,Z_0)$ may represent the PSF for the particular subregion of pixels (e.g., patch of pixels).

In particular embodiments, based on the determined axial depth position $Z_0$ and the determined number of different lateral positions $(X_1,Y_1,Z_0)(X_2,Y_2,Z_0)$, a corresponding number of PSFs (e.g., individually for each of the RGB color components and/or one or more particular monochromatic color components) may be measured at each of the determined number of different lateral positions $(X_1,Y_1,Z_0)(X_2,Y_2,Z_0)$. In particular embodiments,) the electronic device 102 may then store the measured PSFs (e.g., for each of the RGB color components and/or one or more particular monochromatic color components) corresponding to the determined number of different lateral positions $(X_1,Y_1,Z_0)(X_2,Y_2,Z_0)$ into, for example, the memory 106 to be later utilized to reconstruct images captured by the camera 110 disposed behind the display panel 112 of the electronic device 102. It should be appreciated that while only three lateral positions 404, 406, and 408 and corresponding differing lateral positions $(X_1,Y_1,Z_0)$, $(X_2,Y_2,Z_0)$, and $(X_3,Y_3,Z_0)$ in FIG. 4 for the purpose of illustration, in accordance with the presently disclosed embodiments, any number of lateral positions 404, 406, and 408 and corresponding differing lateral positions $(X_1,Y_1,Z_0)$, $(X_2,Y_2,Z_0)$, and $(X_3,Y_3,Z_0)$ may be determined, and thus any number of PSFs may be measured. Indeed, as will be further be further appreciated below, by storing PSFs measured at the axial depth position $Z_0$ and the differing lateral positions $(X_1,Y_1,Z_0)$, $(X_2,Y_2,Z_0)$, and $(X_3,Y_3,Z_0)$ to the memory 106, the present techniques may allow the electronic device 102 to perform image reconstruction by utilizing the respective measured PSFs to stitch together the reconstructed image based on the particular subregions of pixels to which the respective measured PSFs correspond.

Figure 5:
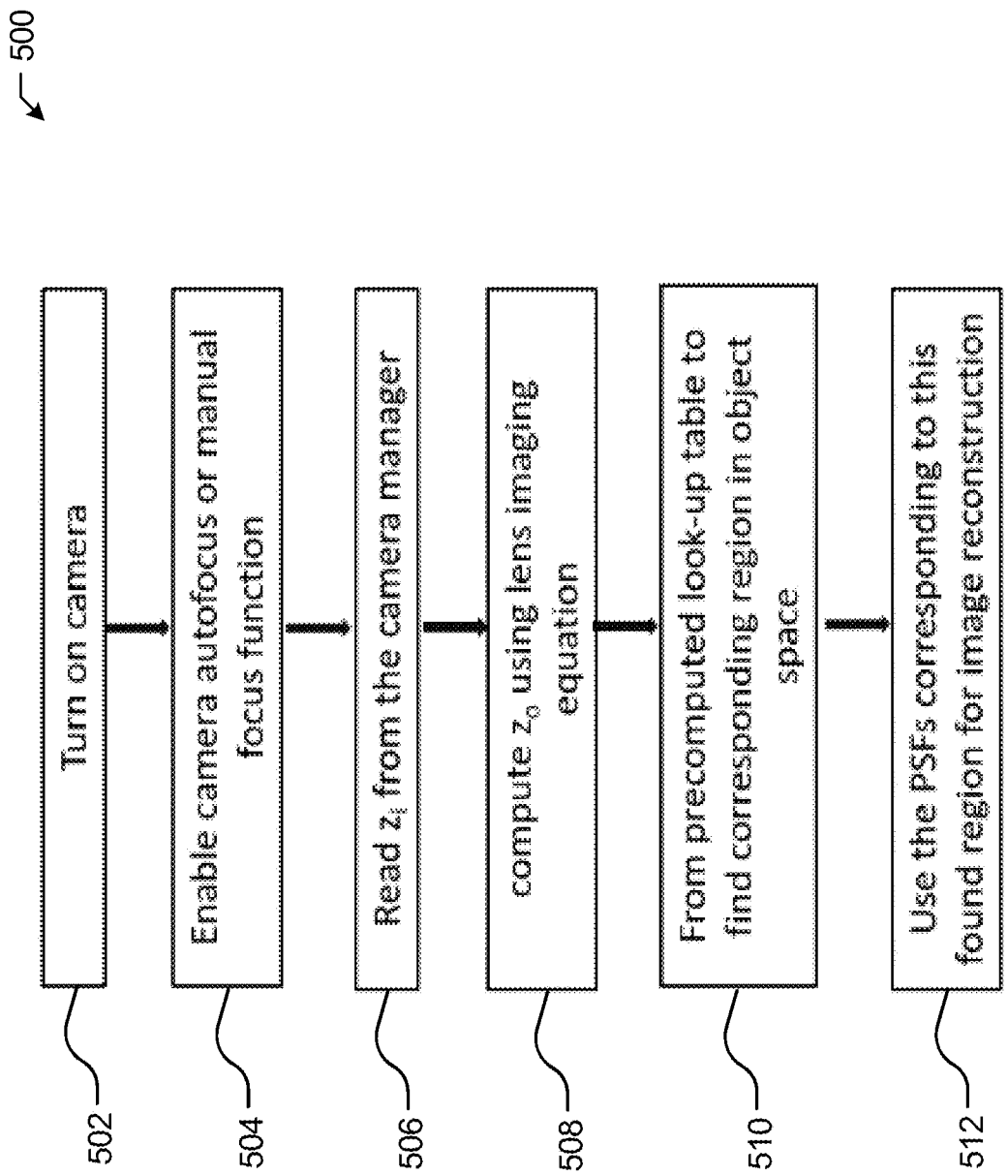
FIG. 5 illustrates is a flow diagram of a method for determining particular subregions and the corresponding particular measured and stored PSFs to be utilized for image reconstruction.

FIG. 5 illustrates is a flow diagram of a method 500 for determining particular subregions and the corresponding particular measured and stored PSFs to be utilized for image reconstruction, in accordance with the presently disclosed embodiments. The method 500 may be performed utilizing one or more processing devices (e.g., the one or more processors 104) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof. In particular embodiments, one or more blocks of the method 500 may be performed only once or on an as-needed (e.g., per request/instruction) basis, such as when a photograph is being captured. In particular embodiments, one or more blocks of the method 500 may be performed continuously and/or iteratively (e.g., automatically running multiple times over a duration of time), such as when a video is being recorded or when a camera application is executing a viewfinder/camera-preview is being continuously displayed.

The method 500 may begin at block 502 with the one or more processing devices (e.g., the one or more processors 104 of the electronic device 102) turning on the camera 110 and continuing at block 504 with enabling camera auto focus or manual focus to focus on an object of interest within a real world scene. The method 500 may continue at block 506 with the one or more processing devices (e.g., the one or more processors 104 of the electronic device 102) determining an image sensor 122 to camera lens 124 distance $Z_i$ of the camera 110 and then at block 508 with determining the axial depth position $Z_0$ of the object of interest within the real world scene (e.g., based on lens equation utilizing the known the image sensor 122 to camera lens 124 distance $Z_i$). The method 500 may continue at block 510 with the one or more processing devices (e.g., the one or more processors 104 of the electronic device 102) determining the particular subregions of pixels (e.g., differing lateral positions $(X_1,Y_1,Z_0)$, $(X_2,Y_2,Z_0)$, and $(X_3,Y_3,Z_0)$) corresponding to the determined axial depth position $Z_0$ and concluding at block 512 with selecting the measured and stored PSFs from, for example, a look-up table (LUT) of the memory 106 corresponding to the particular subregions of pixels (e.g., differing lateral positions $(X_1,Y_1,Z_0)$, $(X_2,Y_2,Z_0)$, and $(X_3,Y_3,Z_0)$) for image reconstruction.

Figure 6A:
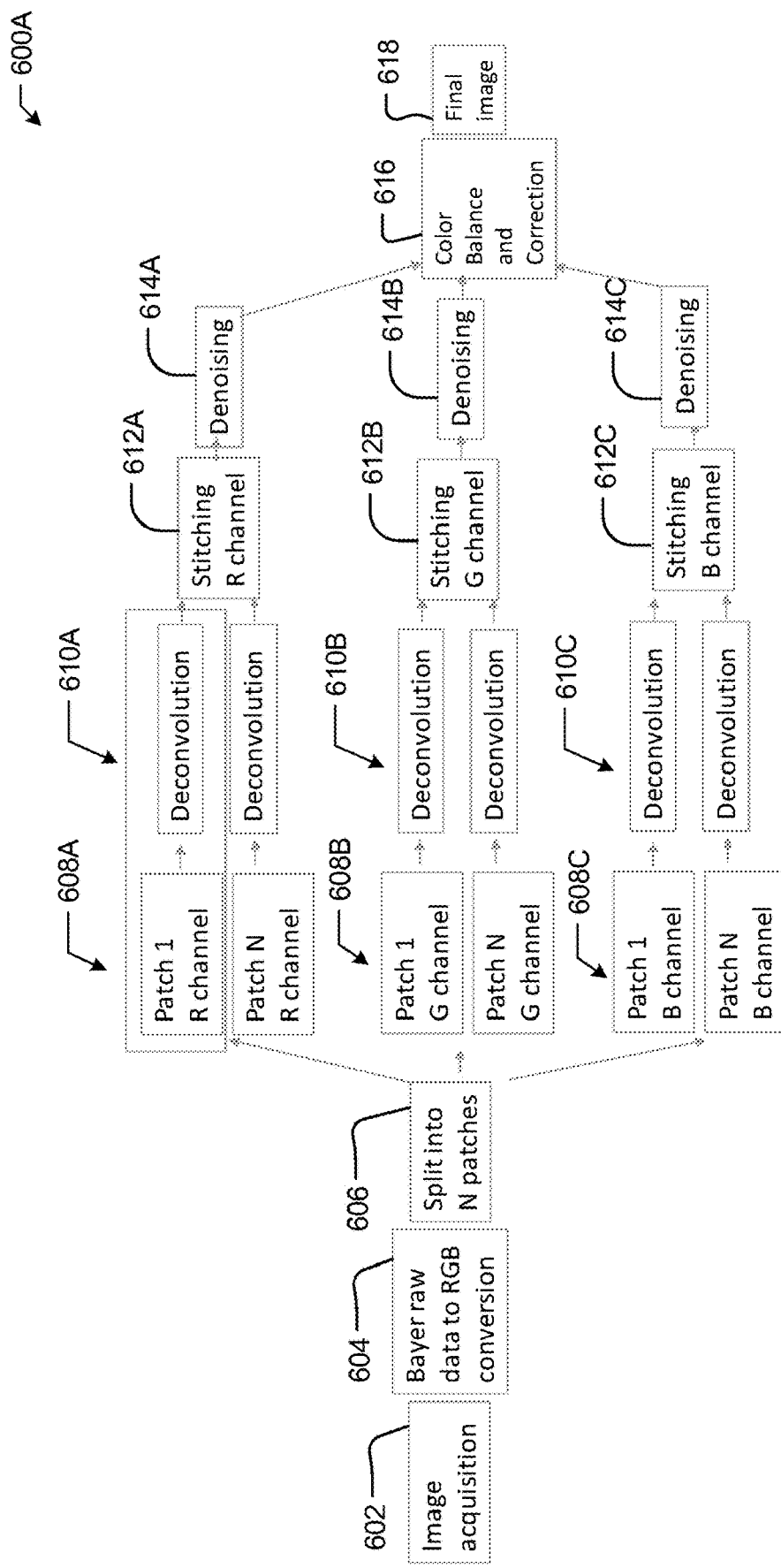
FIG. 6A illustrates a workflow diagram for reconstructing an image based on measured and stored PSFs at a determined axial depth position and differing lateral positions.

FIG. 6A illustrates a workflow diagram 600A for reconstructing an image based on measured and stored PSFs at a determined axial depth position $Z_0$ and differing lateral positions $(X_1,Y_1,Z_0)$, $(X_2,Y_2,Z_0)$, and $(X_3,Y_3,Z_0)$. For example, in particular embodiments, an original image may be captured (at functional block 602). Bayer raw image data corresponding to the original image may be then converted (at functional block 604) into separate RGB color components and split (at functional block 606) into a number of image patches (at functional blocks 608A, 608B, and 608C). In particular embodiments, for each of the RGB color component image patches, deconvolutions (at block 610A, 610B, and 610C) may be performed utilizing the stored measured and stored PSFs corresponding to the respective image patches. In particular embodiments, multiple reconstructed patches may be stitched together (at functional blocks 612A, 612B, and 612C) into a single RGB reconstruction image that may be further filtered for denoising (at functional blocks 614A, 614B, and 614C) to reduce the noise. In particular embodiments, color balancing and correction (at functional block 616) may be performed on the reconstruction image and then output the finalized stitched-together reconstruction image (at functional block 618).

Figure 6B:
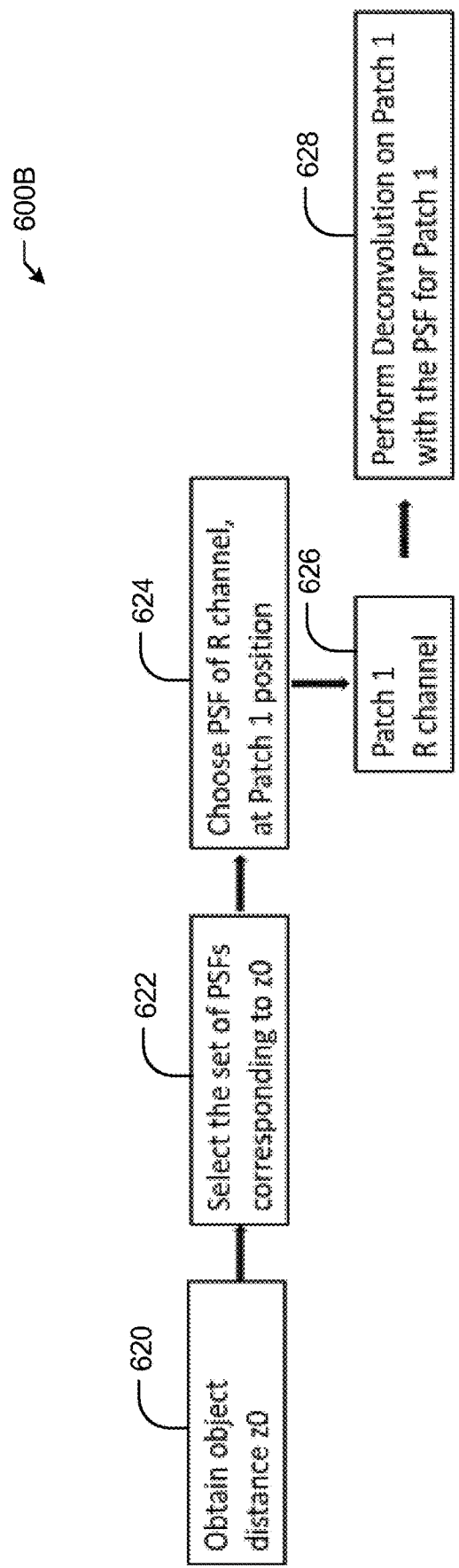
FIG. 6B illustrates another workflow diagram for reconstructing an image based on measured and stored PSFs at a determined axial depth position and differing lateral positions.
Figure 10:
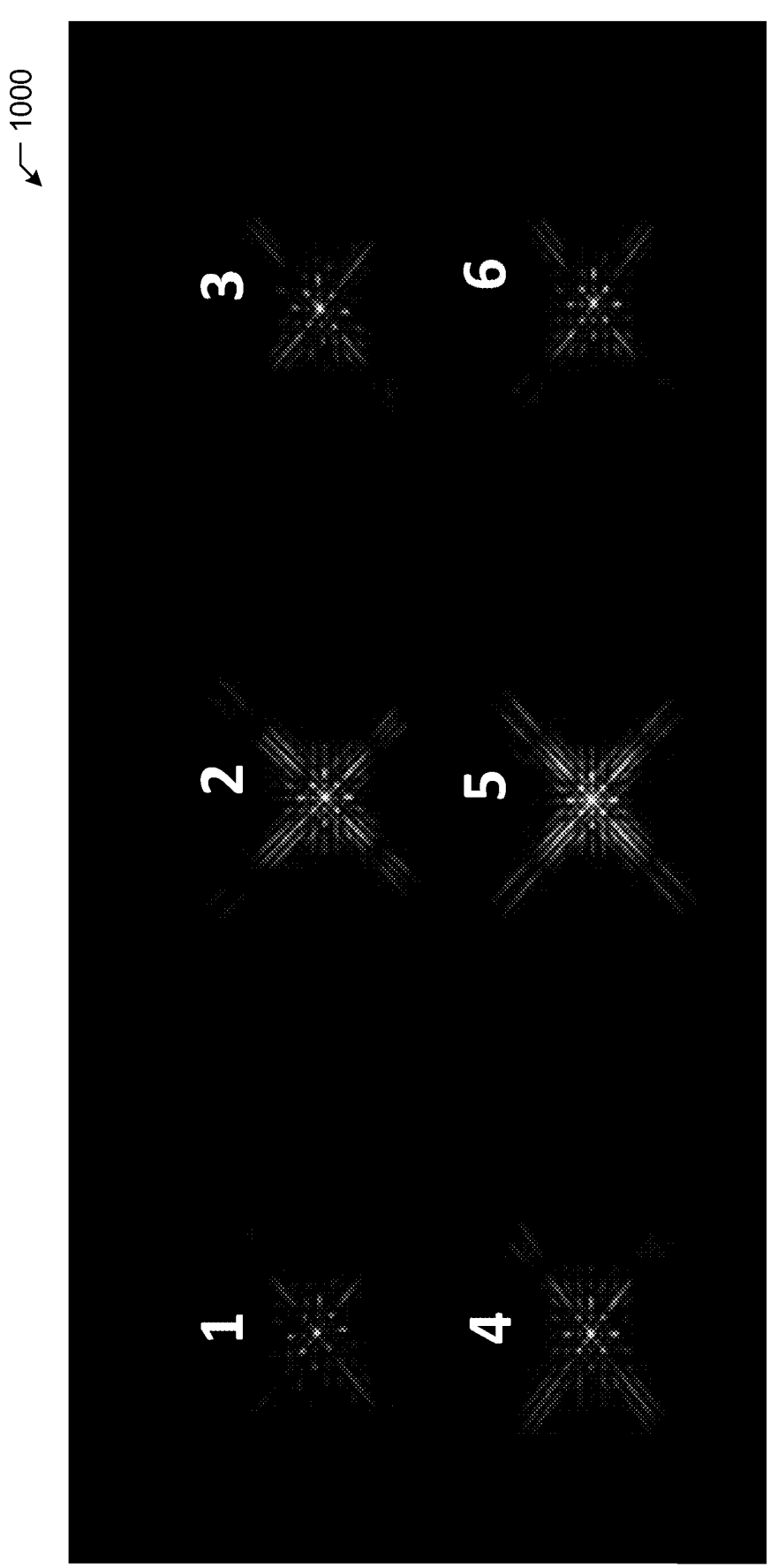
FIGS. 10-14 illustrate a running example for reconstructing an original image utilizing PSFs measured at a particular depth position and at a number of different lateral positions.

Similarly, FIG. 6B illustrates a workflow diagram 600B that describes the function of the dashed rectangle in FIG. 6A. In particular embodiments, based on the determined axial depth position $Z_0$ (at functional block 620), the respective measured and stored PSFs corresponding to the determined axial depth position $Z_0$ may be selected (at functional block 622), for example, from one or more LUTs within the memory 106 of the electronic device 102. A further selection of the respective measured PSF corresponding to the particular image patch may be determined and then the deconvolution (at functional block 628) of each of the RGB color components (at functional block 626) may be performed.

FIG. 7, FIG. 8, and FIG. 9 illustrate example experimental data, which includes a position data plot 700 and a PSF LUT 800, and position data table 900. The position data plot 700 may depict depth of focus (DOF) plotted against axial depth position $Z_0$, in accordance with the presently disclosed embodiments. Similarly, the PSF LUT 800 may include axial depth position $Z_0$ (e.g., 300 mm, 325 mm, 350 mm, 375 mm, 400 mm, 420 mm, 425 mm, 450 mm, and so forth) and the respective measured PSFs corresponding to the differing lateral positions $(X_1,Y_1,Z_0)$, $(X_2,Y_2,Z_0)$, and $(X_3,Y_3,Z_0)$. Lastly, the position data table 900 may simply depict the relationship between axial depth position $Z_0$ and the lateral subregions (e.g., corresponding to the differing lateral positions $(X_1,Y_1,Z_0)$, $(X_2,Y_2,Z_0)$, and $(X_3,Y_3,Z_0)$) at which the PSFs are measured and stored to the PSF LUT 800.

FIGS. 10-20 illustrate one or more running examples of the presently disclosed techniques of reconstructing images based on multiple PSFs (e.g., individually for each of the RGB color components and/or one or more particular monochromatic color components) captured at a particular depth position and differing lateral positions. For example, FIGS. 10-14 may depict a running example in which an original image may be captured and reconstructed utilizing PSFs measured at, for example, up to a total of 6 different lateral positions $(X_1,Y_1,Z_0)$, $(X_2,Y_2,Z_0)$, and $(X_3,Y_3,Z_0)$, $(X_4,Y_4,Z_0)$, $(X_5,Y_5,Z_0)$, and $(X_6,Y_6,Z_0)$. Similarly, FIGS. 15-20 may depict another running example in which an original image may be captured and reconstructed utilizing PSFs measured at, for example, up to a total of 35 different lateral positions $(X_1,Y_1,Z_0)$-$(X_{35},Y_{35},Z_0)$. For example, referring first to FIG. 10, in particular embodiments, a number of PSFs (e.g., individually for each of the RGB color components and/or one or more particular monochromatic color components) may be measured at each of a determined number of different lateral positions (e.g., 6 different lateral positions $(X_1,Y_1,Z_0)$, $(X_2,Y_2,Z_0)$, and $(X_3,Y_3,Z_0)$, $(X_4,Y_4,Z_0)$, $(X_5,Y_5,Z_0)$, and $(X_6,Y_6,Z_0)$). As depicted, the six different lateral positions $(X_1,Y_1,Z_0)$, $(X_2,Y_2,Z_0)$, and $(X_3,Y_3,Z_0)$, $(X_4,Y_4,Z_0)$, $(X_5,Y_5,Z_0)$, and $(X_6,Y_6,Z_0)$ may each correspond to a different subregion of pixels and, as may be observed, may each include a different measured PSF.

Figure 11B:
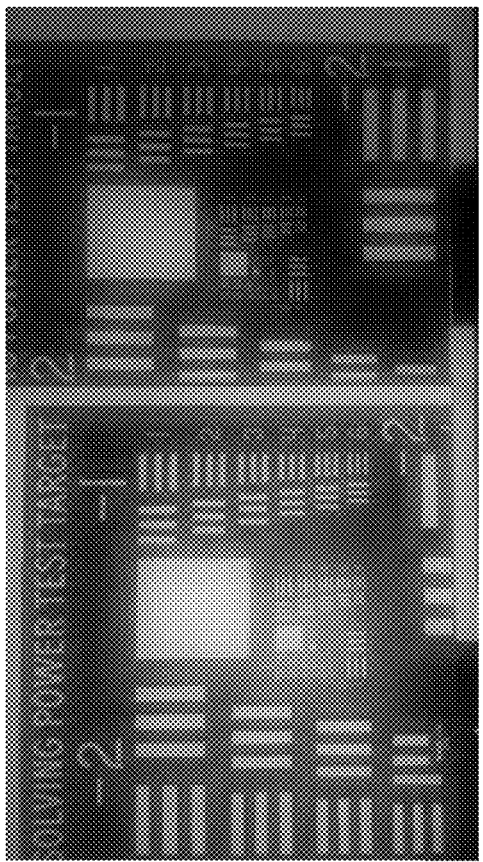
Figure 11A:
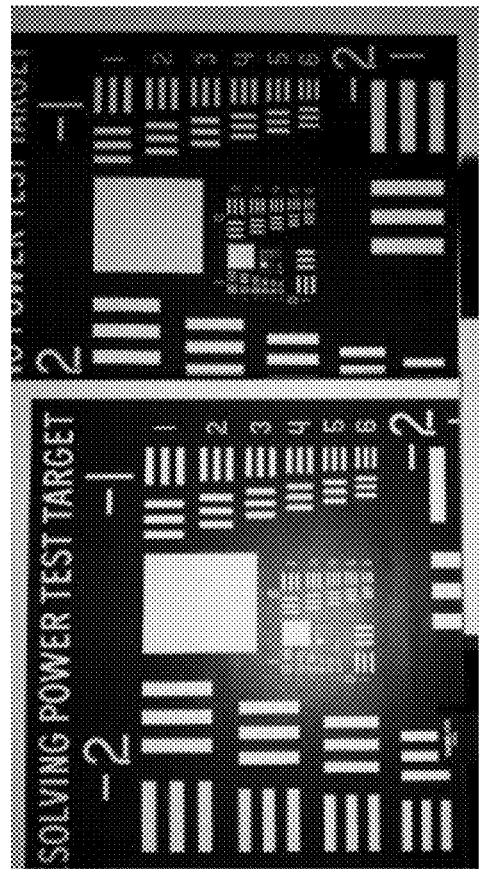
Figure 12:
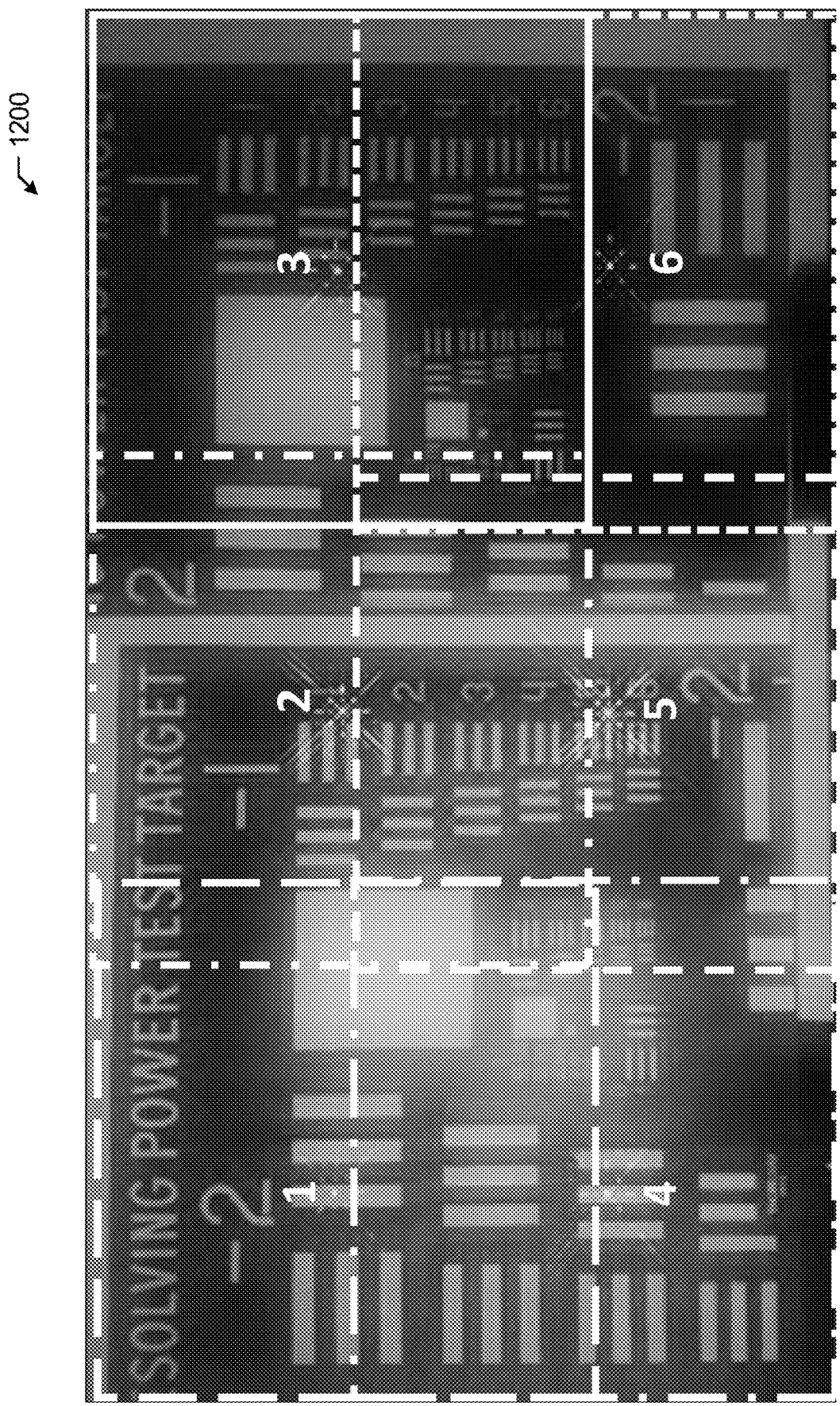
Figure 13:
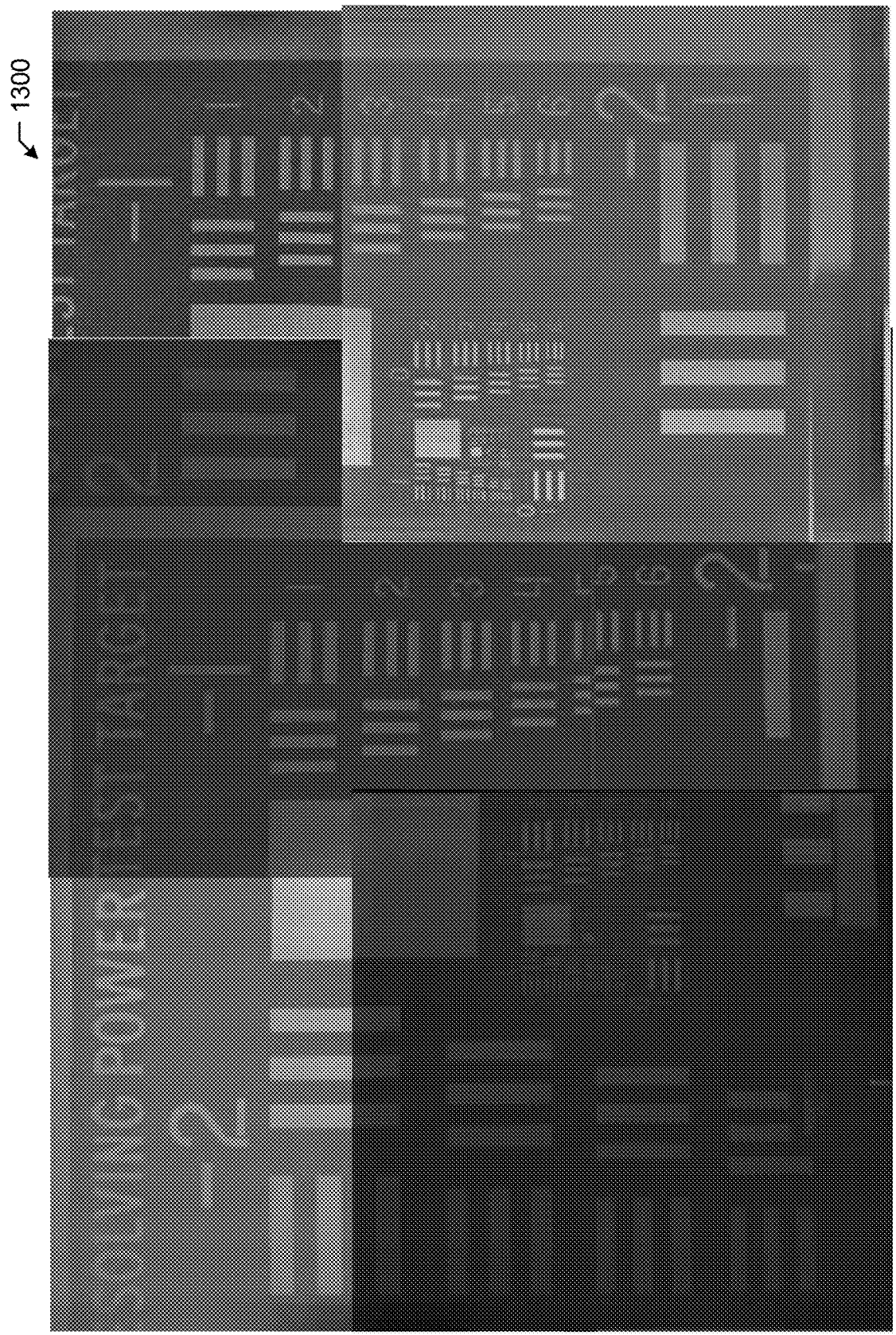
Figure 14:
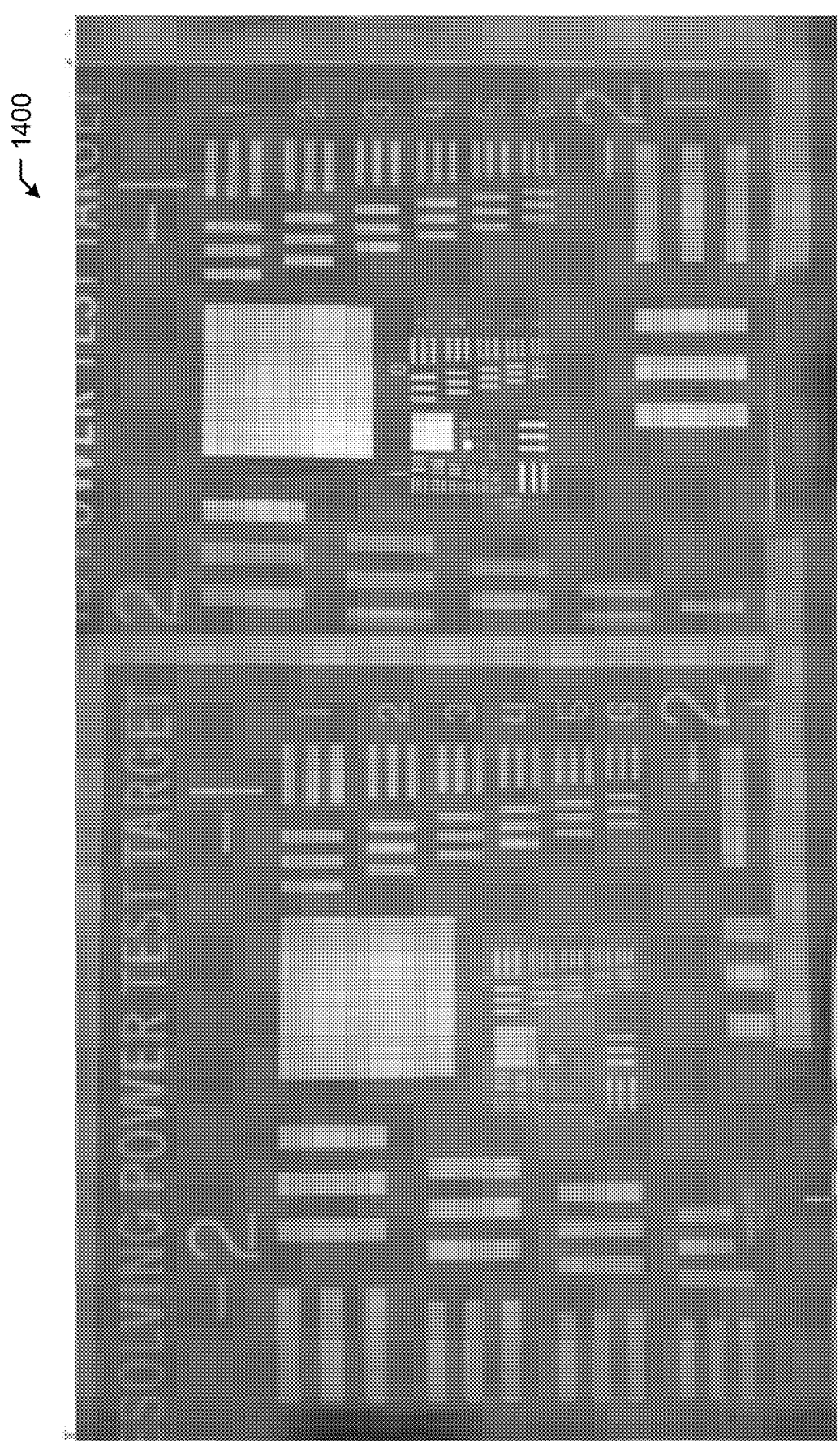

Continuing the example, FIGS. 11A and 11B illustrate a real world scene 1100A and an original image 1100B, respectively. Based on the determined subregions and the measured PSFs corresponding to the subregions (e.g., and corresponding to the six different lateral positions $(X_1,Y_1,Z_0)$, $(X_2,Y_2,Z_0)$, and $(X_3,Y_3,Z_0)$, $(X_4,Y_4,Z_0)$, $(X_5,Y_5,Z_0)$, and $(X_6,Y_6,Z_0)$) that may be selected for example, from one or more LUTs, image patches (e.g., image patches "1", "2", "3", "4", "5", and "6") may be generated and utilized to generate a stitched-together reconstructed image 1200 as depicted in FIG. 12. FIG. 13 shows the six restored patches prior to performing the image stitching process. FIG. 14 depicts the final stitched reconstructed image 1400 from the six restored image patches. It should be appreciated that FIG. 14 is included merely for the purposes of illustration of the presently disclosed techniques. That is, while the reconstructed image 1400 may still include some blurring artifacts when generated based on utilizing only six PSFs for the entire reconstructed image, the presently disclosed embodiments may include generating reconstructed images utilizing an N number of PSFs corresponding to an N number of different lateral positions (e.g., $(X_1,Y_1,Z_0)$-$(X_N,Y_N,Z_0)$) to completely recover the original image (e.g., a recovered image more akin to the real world scene 1100A in FIG. 11A).

Figure 15:
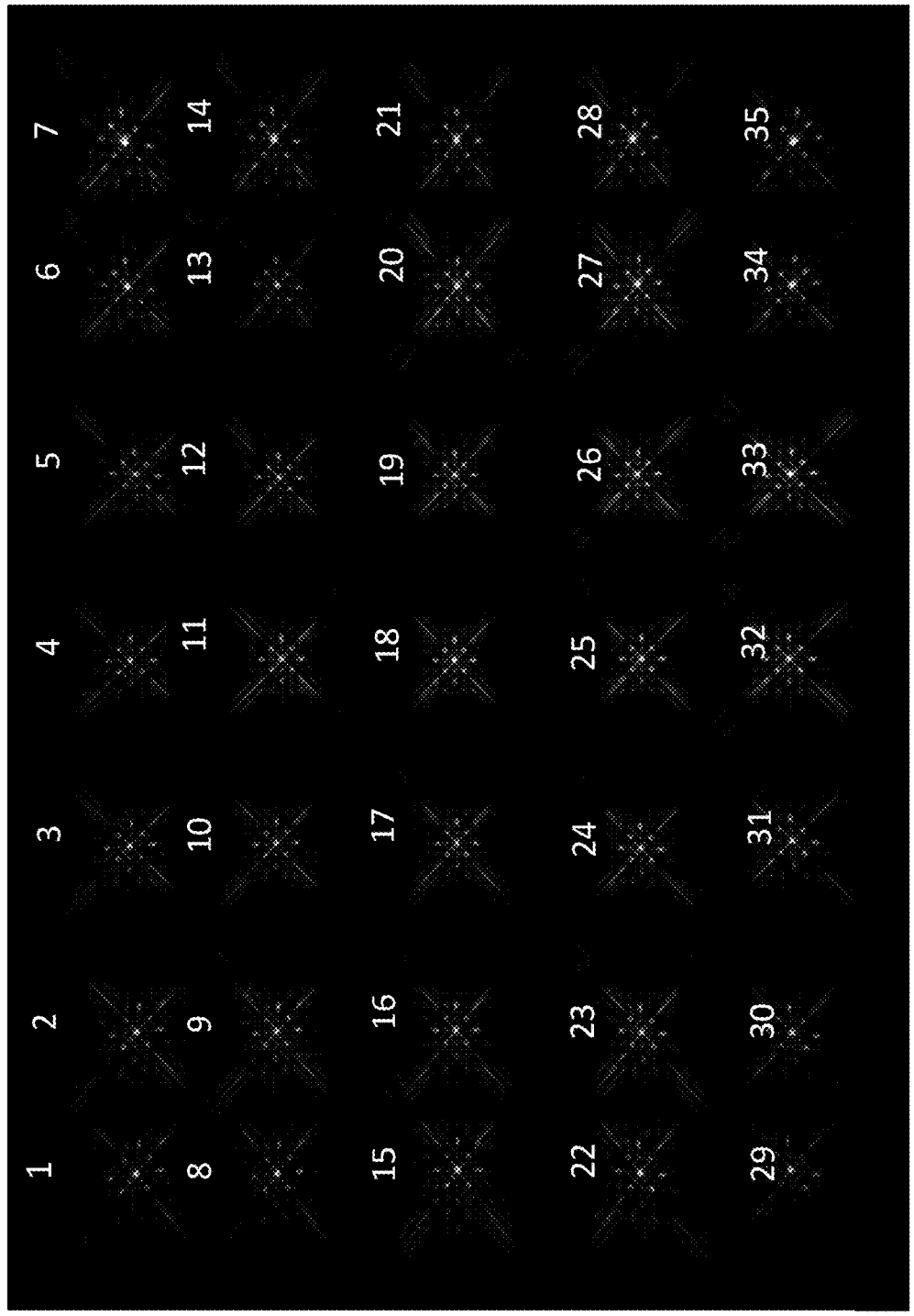
FIGS. 15-20 illustrate another running example for reconstructing an original image utilizing PSFs measured at a particular depth position and at a number of different lateral positions.
Figure 16:
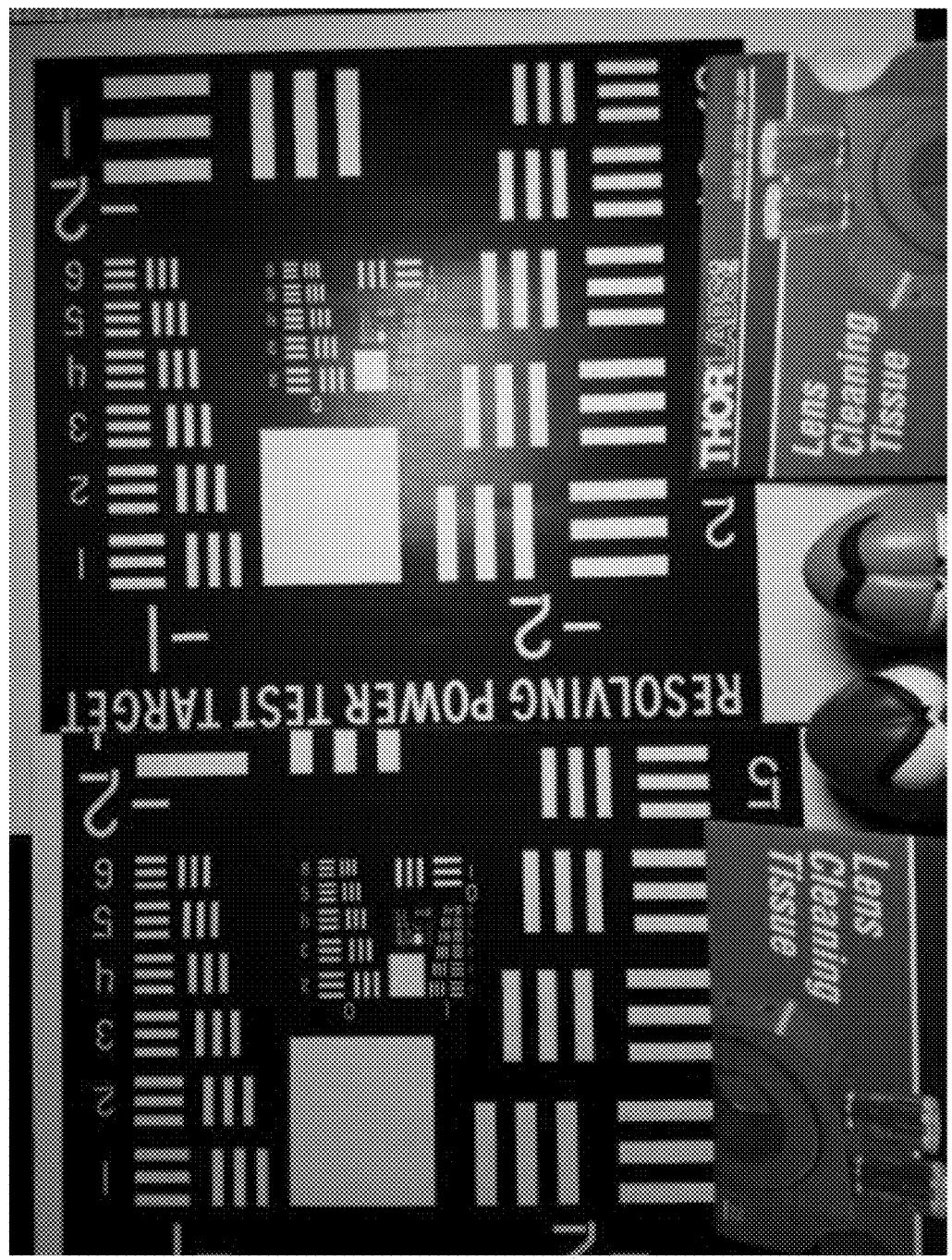
Figure 17:
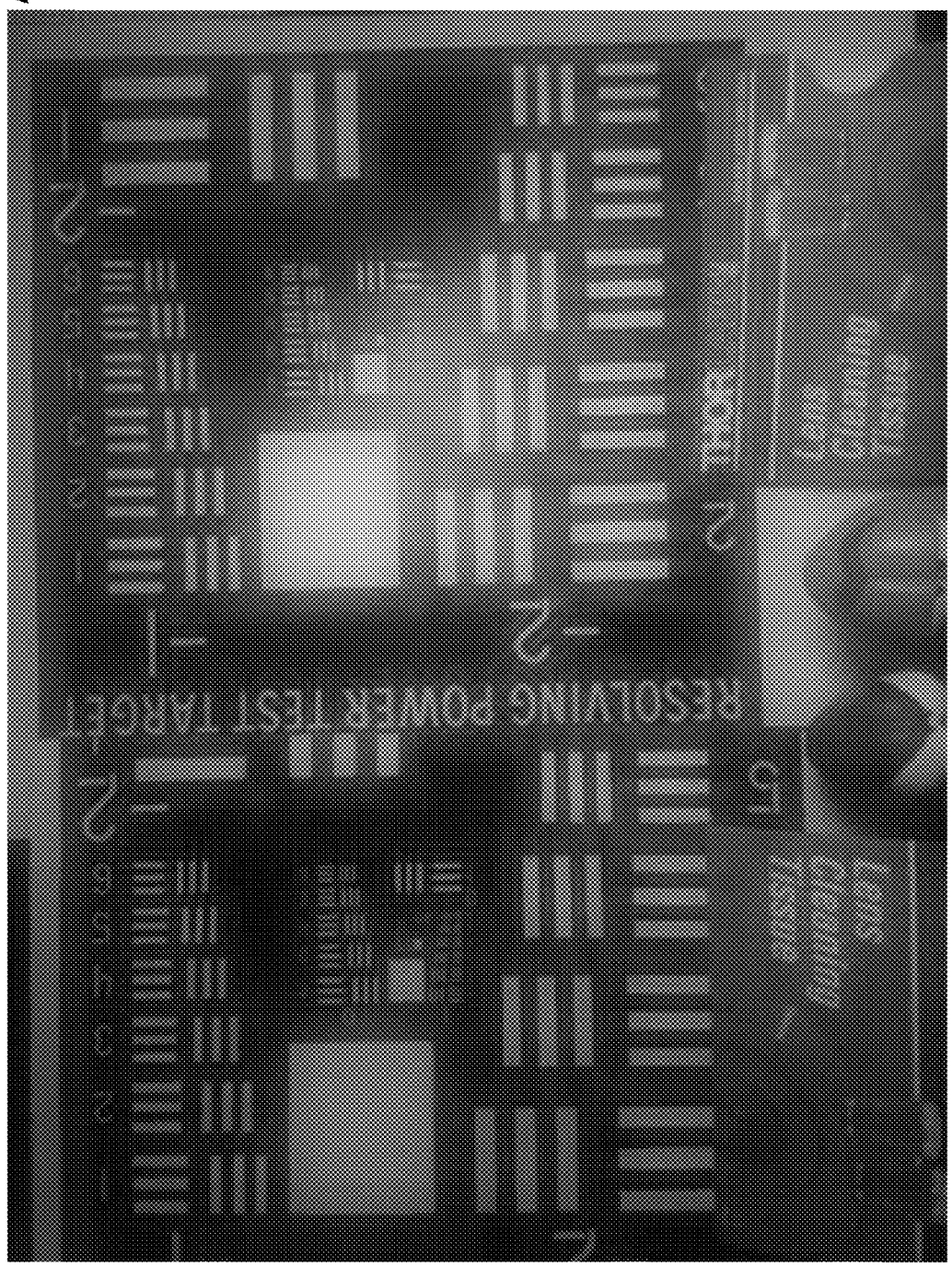
Figure 18:
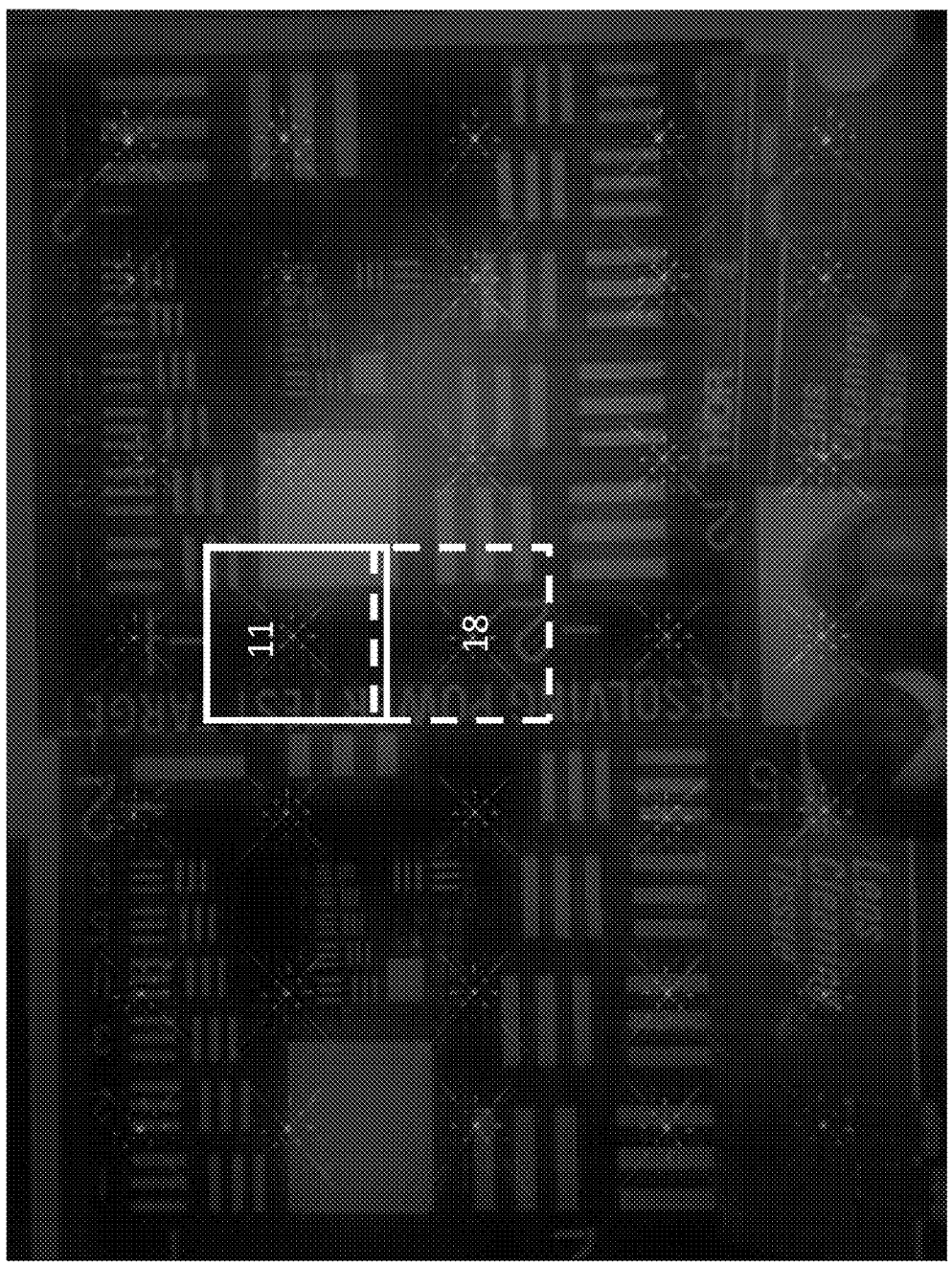
Figure 19:
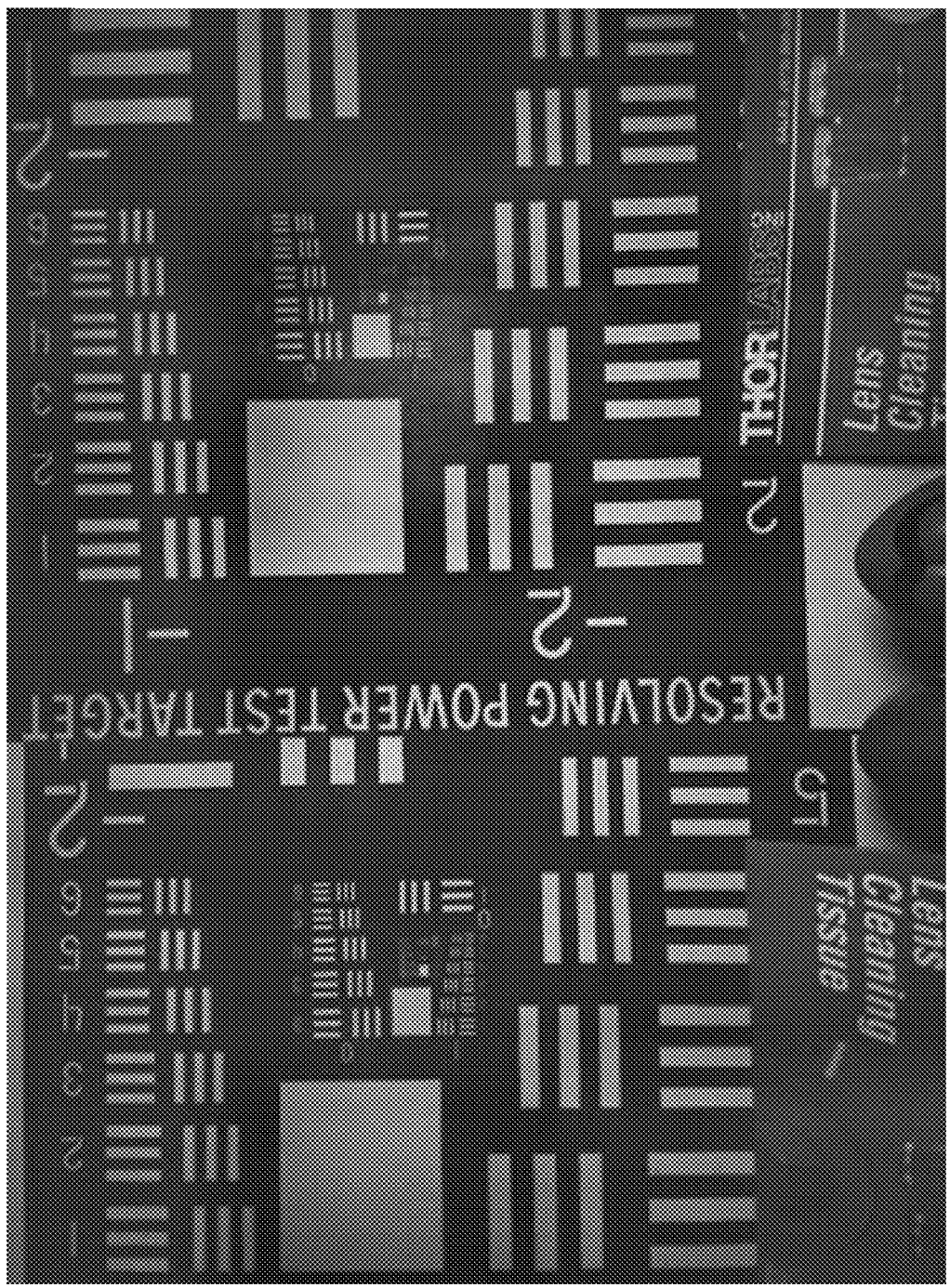
Figure 20:
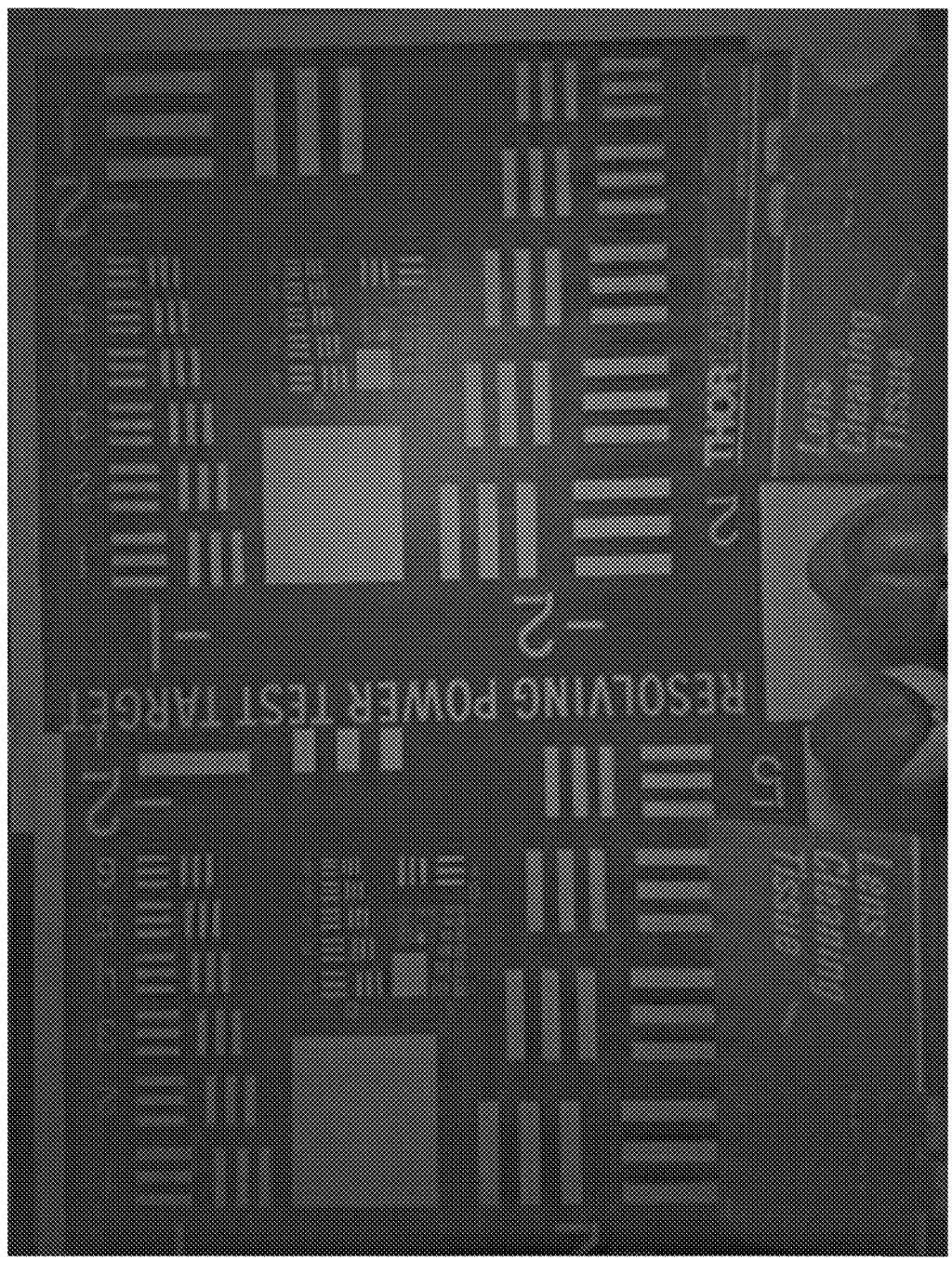

For example, in particular embodiments, referring now to FIG. 15, a number of PSFs may be measured at each of a determined number of different lateral positions (e.g., 35 different lateral positions $(X_1,Y_1,Z_0)$-$(X_{35},Y_{35},Z_0)$). As depicted, the 35 different lateral positions $(X_1,Y_1,Z_0)$-$(X_{35},Y_{35},Z_0)$ may each correspond to a different subregion of pixels and, as may be observed, may each include a different measured PSF. Continuing the example, FIGS. 16 and 17 illustrate a real world scene 1600 and an original image 1700, respectively. Based on the determined subregions and the measured PSFs corresponding to the subregions (e.g., and corresponding to the 35 different lateral positions $(X_1,Y_1,Z_0)$-$(X_{35},Y_{35},Z_0)$) that may be selected for example, from one or more LUTs, image patches (e.g., image patches "1"-"35") may be generated and utilized to generate a stitched-together reconstructed image 1800 as depicted in FIG. 18 and a final reconstructed image 1900 as depicted in FIG. 19. For the purposes of illustration and conciseness, only image patches "11" and "18" are depicted in the stitched-together reconstructed image 1800. However, it should be appreciated that the measured and stored PSFs corresponding to each of the 35 different lateral positions $(X_1,Y_1,Z_0)$-$(X_{35},Y_{35},Z_0)$ may be utilized to generate the stitched-together reconstructed image 1800. FIG. 20 depicts a reconstructed image 2000, which illustrates that, without the presently techniques of reconstructing an image based on measured and stored PSFs at a determined axial depth position and differing lateral positions, the reconstructed image 2000 may still include blurring artifacts when generated based on utilizing only a single PSF for the entire reconstructed image.

Figure 21:
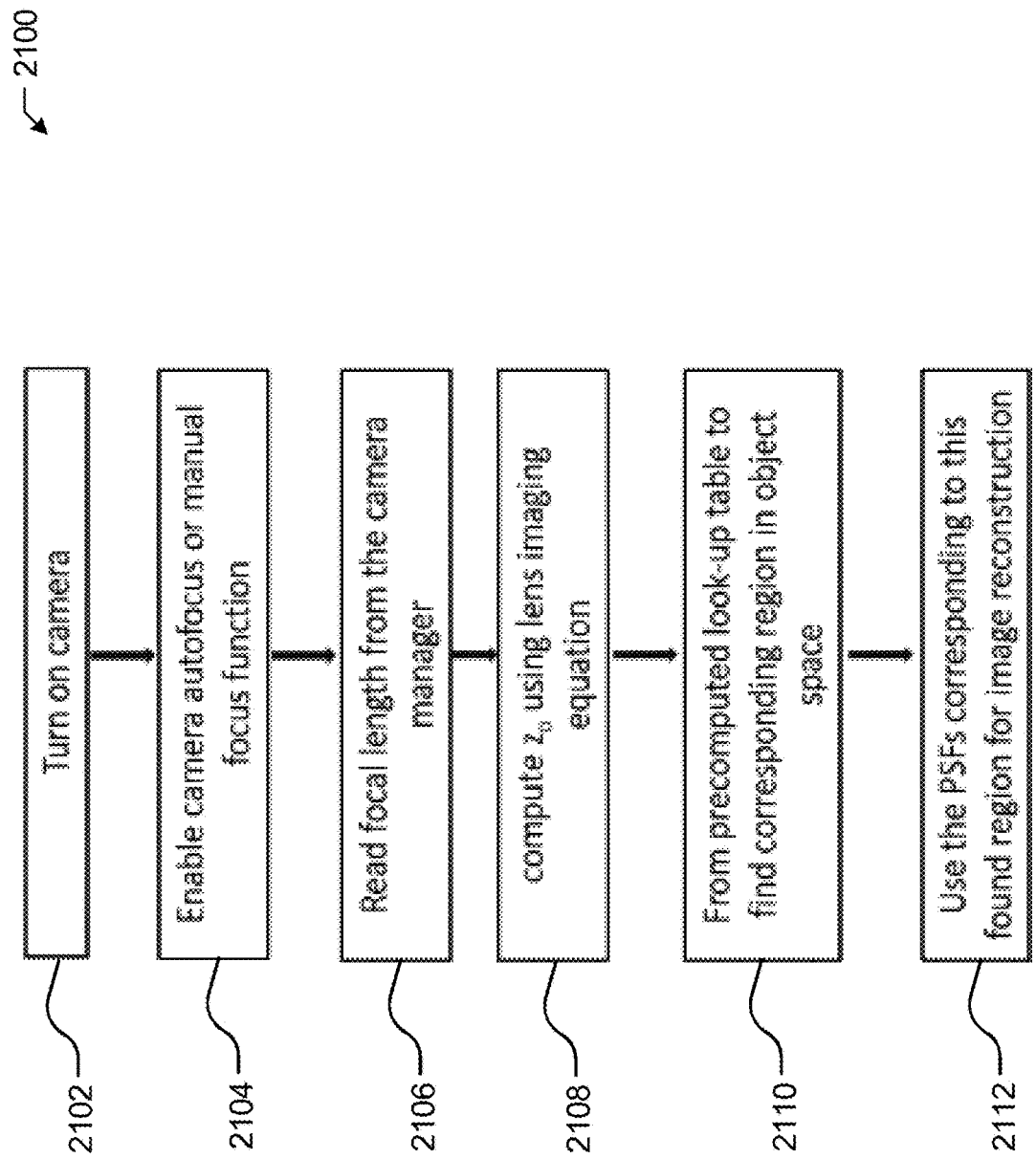
FIG. 21 illustrates is a flow diagram of a method for determining particular subregions and the corresponding particular measured and stored PSFs to be utilized for image reconstruction.

FIG. 21 illustrates is a flow diagram of a method 2100 for determining particular subregions and the corresponding particular measured and stored PSFs to be utilized for image reconstruction, in accordance with the presently disclosed embodiments. The method 2100 may be performed utilizing one or more processing devices (e.g., the one or more processors 104) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof. In particular embodiments, one or more blocks of the method 2100 may be performed only once or on an as-needed (e.g., per request/instruction) basis, such as when a photograph is being captured. In particular embodiments, one or more blocks of the method 2100 may be performed continuously and/or iteratively (e.g., automatically running multiple times over a duration of time), such as when a video is being recorded or when a camera application is executing a viewfinder/camera-preview is being continuously displayed.

The method 2100 may begin at block 502 with the one or more processing devices (e.g., the one or more processors 104 of the electronic device 102) turning on the camera 110 and continuing at block 2104 with enabling camera auto focus or manual focus to focus on an object of interest within a real world scene. The method 2100 may continue at block 2106 with the one or more processing devices (e.g., the one or more processors 104 of the electronic device 102) reading an image sensor 122 to camera lens 124 distance $Z_i$ directly from the camera 110 and then at block 2108 with determining the axial depth position $Z_0$ of the object of interest within the real world scene (e.g., based on lens equation utilizing the read focal length $Z_i$). The method 2100 may continue at block 2110 with the one or more processing devices (e.g., the one or more processors 104 of the electronic device 102) determining the particular subregions of pixels (e.g., differing lateral positions $(X_1,Y_1,Z_0)$, $(X_2,Y_2,Z_0)$, and $(X_3,Y_3,Z_0)$) corresponding to the determined axial depth position $Z_0$ and concluding at block 2112 with selecting the measured and stored PSFs from, for example, a look-up table (LUT) of the memory 106 corresponding to the particular subregions of pixels (e.g., differing lateral positions $(X_1,Y_1,Z_0)$, $(X_2,Y_2,Z_0)$, and $(X_3,Y_3,Z_0)$) for image reconstruction.

Figure 22:
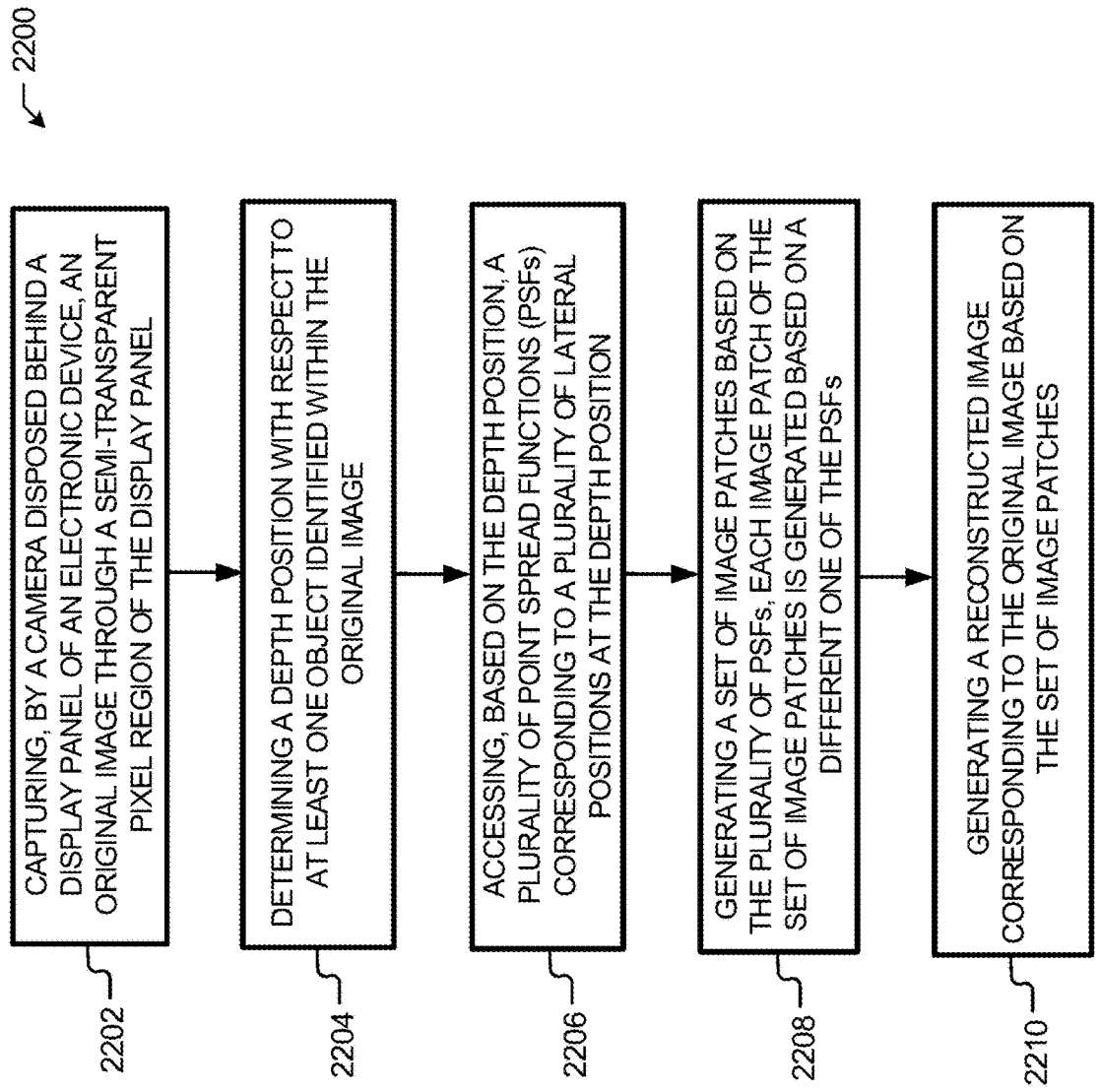
FIG. 22 illustrates a flow diagram of a method for reconstructing an image captured by a camera disposed behind a display of an electronic device using multiple PSFs.

FIG. 22 illustrates is a flow diagram of a method 2200 for reconstructing images captured by a camera disposed behind a display of an electronic device based on multiple PSFs captured at a particular depth and differing lateral positions, in accordance with the presently disclosed embodiments. The method 2200 may be performed utilizing one or more processing devices (e.g., the one or more processors 104) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof. In particular embodiments, one or more blocks of the method 2200 may be performed only once or on an as-needed (e.g., per request/instruction) basis, such as when a photograph is being captured. In particular embodiments, one or more blocks of the method 2200 may be performed continuously and/or iteratively (e.g., automatically running multiple times over a duration of time), such as when a video is being recorded or when a camera application is executing a viewfinder/camera-preview is being continuously displayed.

The method 2200 may begin block 2202 with the one or more processing devices (e.g., one or more processors 104 of the electronic device 102) capturing, by a camera disposed behind a display panel of the electronic device, an original image through a semi-transparent pixel region of the display panel, in which the original image includes one or more color components. The method 2200 may then continue at block 2204 with the one or more processing devices (e.g., one or more processors 104 of the electronic device 102) determining a depth position with respect to at least one object identified within the original image. The method 2200 may then continue at block 2206 with the one or more processing devices (e.g., one or more processors 104 of the electronic device 102) accessing, based on the depth position, a plurality of point spread functions (PSFs) corresponding to a plurality of lateral positions at the depth position. The method 2200 may then continue at block 2208 with the one or more processing devices (e.g., one or more processors 104 of the electronic device 102) generating a set of image patches based on the plurality of PSFs, wherein each image patch of the set of image patches is generated based on a different one of the plurality of PSFs. The method 2200 may then conclude at block 2210 with the one or more processing devices (e.g., one or more processors 104 of the electronic device 102) generating a reconstructed image corresponding to the original image based on the set of image patches.

In this way, the present embodiments may increase the viewing area and the resolution of the display panel 112 of the electronic device 102 by disposing one or more front-facing cameras 110 of the electronic device 102 behind the display panel 112. For example, because of the increase in display area (e.g., having eliminated the display area typically designated for the one or more front-facing cameras 110), the electronic device 102 may further provide for improved (GUIs) with a full screen view in its entirety, as opposed to limited to only displaying battery status, cellular signal strength data, Wi-Fi status, time info, and so forth, in line with a notch design or hole-punch design. The present techniques may further increase an aesthetic quality of the electronic device 102, as well as allow a user of the electronic device 102 to display higher resolution images on the display panel 112 of the electronic device 102. Still further, because the one or more front-facing cameras 110 may be placed behind the display panel 112, the present techniques may allow the one or more front-facing cameras 110 to be placed anywhere, such as in a center area of the display panel 112 (e.g., as opposed to in a corner or along an edge of the display panel 112) of the electronic device 102. This may provide an improved user experience and/or GUI, such as by directing a user taking a selfie to gaze at the center area of the display panel 112, and further by giving the impression of eye-to-eye contact with another user when the user is participating in a videoconference, a videotelephonic exchange, or other video-streaming service.

Figure 23:
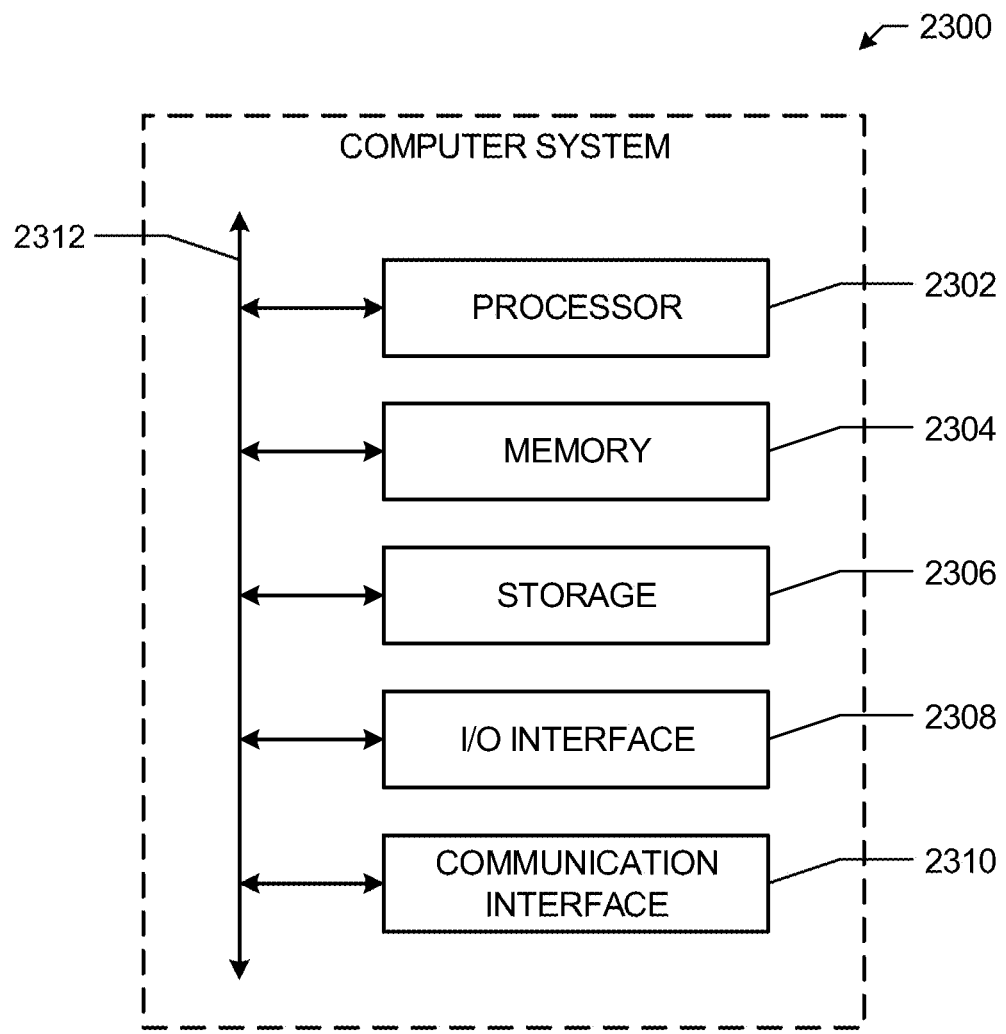
FIG. 23 illustrates an example computer system.

FIG. 23 illustrates an example computer system 2300 that may be utilized for reconstructing images captured by a camera disposed behind a display of an electronic device based on multiple PSFs captured at a particular depth and differing lateral positions, in accordance with the presently disclosed embodiments. In particular embodiments, one or more computer systems 2300 perform one or more steps of one or more methods described or illustrated herein. In particular embodiments, one or more computer systems 2300 provide functionality described or illustrated herein. In particular embodiments, software running on one or more computer systems 2300 performs one or more steps of one or more methods described or illustrated herein or provides functionality described or illustrated herein. Particular embodiments include one or more portions of one or more computer systems 2300. Herein, reference to a computer system may encompass a computing device, and vice versa, where appropriate. Moreover, reference to a computer system may encompass one or more computer systems, where appropriate.

This disclosure contemplates any suitable number of computer systems 2300. This disclosure contemplates computer system 2300 taking any suitable physical form. As example and not by way of limitation, computer system 2300 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 2300 may include one or more computer systems 2300; be unitary or distributed; span multiple locations; span multiple machines; span multiple data centers; or reside in a cloud, which may include one or more cloud components in one or more networks.

Where appropriate, one or more computer systems 2300 may perform without substantial spatial or temporal limitation one or more steps of one or more methods described or illustrated herein. As an example, and not by way of limitation, one or more computer systems 2300 may perform in real time or in batch mode one or more steps of one or more methods described or illustrated herein. One or more computer systems 2300 may perform at different times or at different locations one or more steps of one or more methods described or illustrated herein, where appropriate.

In particular embodiments, computer system 2300 includes a processor 2302, memory 2304, storage 2306, an input/output (I/O) interface 2306, a communication interface 2310, and a bus 2312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 2302 includes hardware for executing instructions, such as those making up a computer program. As an example, and not by way of limitation, to execute instructions, processor 2302 may retrieve (or fetch) the instructions from an internal register, an internal cache, memory 2304, or storage 2306; decode and execute them; and then write one or more results to an internal register, an internal cache, memory 2304, or storage 2306. In particular embodiments, processor 2302 may include one or more internal caches for data, instructions, or addresses. This disclosure contemplates processor 2302 including any suitable number of any suitable internal caches, where appropriate. As an example, and not by way of limitation, processor 2302 may include one or more instruction caches, one or more data caches, and one or more translation lookaside buffers (TLBs). Instructions in the instruction caches may be copies of instructions in memory 2304 or storage 2306, and the instruction caches may speed up retrieval of those instructions by processor 2302.

Data in the data caches may be copies of data in memory 2304 or storage 2306 for instructions executing at processor 2302 to operate on; the results of previous instructions executed at processor 2302 for access by subsequent instructions executing at processor 2302 or for writing to memory 2304 or storage 2306; or other suitable data. The data caches may speed up read or write operations by processor 2302. The TLBs may speed up virtual-address translation for processor 2302. In particular embodiments, processor 2302 may include one or more internal registers for data, instructions, or addresses. This disclosure contemplates processor 2302 including any suitable number of any suitable internal registers, where appropriate. Where appropriate, processor 2302 may include one or more arithmetic logic units (ALUs); be a multi-core processor; or include one or more processors 2302. Although this disclosure describes and illustrates a particular processor, this disclosure contemplates any suitable processor.

In particular embodiments, memory 2304 includes main memory for storing instructions for processor 2302 to execute or data for processor 2302 to operate on. As an example, and not by way of limitation, computer system 2300 may load instructions from storage 2306 or another source (such as, for example, another computer system 2300) to memory 2304. Processor 2302 may then load the instructions from memory 2304 to an internal register or internal cache. To execute the instructions, processor 2302 may retrieve the instructions from the internal register or internal cache and decode them. During or after execution of the instructions, processor 2302 may write one or more results (which may be intermediate or final results) to the internal register or internal cache. Processor 2302 may then write one or more of those results to memory 2304. In particular embodiments, processor 2302 executes only instructions in one or more internal registers or internal caches or in memory 2304 (as opposed to storage 2306 or elsewhere) and operates only on data in one or more internal registers or internal caches or in memory 2304 (as opposed to storage 2306 or elsewhere).

One or more memory buses (which may each include an address bus and a data bus) may couple processor 2302 to memory 2304. Bus 2312 may include one or more memory buses, as described below. In particular embodiments, one or more memory management units (MMUs) reside between processor 2302 and memory 2304 and facilitate accesses to memory 2304 requested by processor 2302. In particular embodiments, memory 2304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 2304 may include one or more memories 2304, where appropriate. Although this disclosure describes and illustrates particular memory, this disclosure contemplates any suitable memory.

In particular embodiments, storage 2306 includes mass storage for data or instructions. As an example, and not by way of limitation, storage 2306 may include a hard disk drive (HDD), a floppy disk drive, flash memory, an optical disc, a magneto-optical disc, magnetic tape, or a Universal Serial Bus (USB) drive or a combination of two or more of these. Storage 2306 may include removable or non-removable (or fixed) media, where appropriate. Storage 2306 may be internal or external to computer system 2300, where appropriate. In particular embodiments, storage 2306 is non-volatile, solid-state memory. In particular embodiments, storage 2306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 2306 taking any suitable physical form. Storage 2306 may include one or more storage control units facilitating communication between processor 2302 and storage 2306, where appropriate. Where appropriate, storage 2306 may include one or more storages 2306. Although this disclosure describes and illustrates particular storage, this disclosure contemplates any suitable storage.

In particular embodiments, I/O interface 2306 includes hardware, software, or both, providing one or more interfaces for communication between computer system 2300 and one or more I/O devices. Computer system 2300 may include one or more of these I/O devices, where appropriate. One or more of these I/O devices may enable communication between a person and computer system 2300. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 2306 for them. Where appropriate, I/O interface 2306 may include one or more device or software drivers enabling processor 2302 to drive one or more of these I/O devices. I/O interface 2306 may include one or more I/O interfaces 2306, where appropriate. Although this disclosure describes and illustrates a particular I/O interface, this disclosure contemplates any suitable I/O interface.

In particular embodiments, communication interface 2310 includes hardware, software, or both providing one or more interfaces for communication (such as, for example, packet-based communication) between computer system 2300 and one or more other computer systems 2300 or one or more networks. As an example, and not by way of limitation, communication interface 2310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 2310 for it.

As an example, and not by way of limitation, computer system 2300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 2300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 2300 may include any suitable communication interface 2310 for any of these networks, where appropriate. Communication interface 2310 may include one or more communication interfaces 2310, where appropriate. Although this disclosure describes and illustrates a particular communication interface, this disclosure contemplates any suitable communication interface.

In particular embodiments, bus 2312 includes hardware, software, or both coupling components of computer system 2300 to each other. As an example, and not by way of limitation, bus 2312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 2312 may include one or more buses 2312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by an electronic device:
capturing, by a camera disposed behind a display panel of the electronic device, an original image through a semi-transparent pixel region of the display panel;
determining a depth position with respect to at least one object identified within the original image;
accessing, based on the depth position, a plurality of N point spread functions (PSFs), each PSF corresponding to a different, specific lateral position of a plurality of lateral positions at the depth position;
generating from the original image, a set of N overlapping image patches of the original image based on the plurality of N PSFs, wherein:
each image patch of the set of N overlapping image patches is generated based on a different one of the plurality of N PSFs;
and a size and a location of each image patch is determined based on a location of the specific lateral position of the PSF used to generate that image patch and based on the number N of PSFs in the plurality of N PSFs; and
generating a reconstructed image corresponding to the original image based on the set of N overlapping image patches of the original image.

2. The method of claim 1, wherein accessing the plurality of N PSFs comprises selecting, from a memory of the electronic device, a plurality of premeasured PSFs corresponding to the plurality of lateral positions, respectively.

3. The method of claim 1, wherein determining the depth position with respect to at least one object comprises calculating the depth position based on a determined image sensor to camera lens distance of the camera or a determined focal length of the camera.

4. The method of claim 1, wherein generating the set of N overlapping image patches based on the plurality of N PSFs comprises generating a subset of image patches for each color component of a plurality of color components.

5. The method of claim 4, wherein generating the reconstructed image further comprises deconvolving each image patch of the subset of image patches for each color component of the plurality of color components.

6. The method of claim 4, wherein generating the reconstructed image further comprises stitching together the subset of image patches for each color component of the plurality of color components.

7. The method of claim 6, wherein generating the reconstructed image further comprises:
performing a filtering of the stitched subset of image patches for each color component of the plurality of color components; and
performing a color balancing and correction of the stitched subset of image patches for each color component of the plurality of color components.

8. An electronic device, comprising:
a display panel;
a camera disposed behind the display panel;
one or more non-transitory computer-readable storage media including instructions; and
one or more processors coupled to the storage media and the camera, the one or more processors configured to execute the instructions to:
capture, by a camera disposed behind a display panel of the electronic device, an original image through a semi-transparent pixel region of the display panel;
determine a depth position with respect to at least one object identified within the original image;
access, based on the depth position, a plurality of point spread functions (PSFs), each PSF corresponding to a different, specific lateral position of a plurality of lateral positions at the depth position;
generate a set of image patches based on the plurality of PSFs, wherein each image patch of the set of image patches is generated based on a different one of the plurality of PSFs and wherein each image patch is associated with the specific lateral position of the PSF used to generate that image patch; and
generate a reconstructed image corresponding to the original image based on the set of image patches.

9. The electronic device of claim 8, wherein the instructions to access the plurality of N PSFs further comprise instructions to select, from a memory of the electronic device, a plurality of premeasured PSFs corresponding to the plurality of lateral positions, respectively.

10. The electronic device of claim 8, wherein the instructions to determine the depth position with respect to at least one object further comprise instructions to calculate the depth position based on a determined image sensor to camera lens distance of the camera or a determined focal length of the camera.

11. The electronic device of claim 8, wherein the instructions to generate the set of N overlapping image patches based on the plurality of N PSFs further comprise instructions to generate a subset of image patches for each color component of a plurality of color components.

12. The electronic device of claim 11, wherein the instructions to generate the reconstructed image further comprise instructions to deconvolve each image patch of the subset of image patches for each color component of the plurality of color components.

13. The electronic device of claim 11, wherein the instructions to generate the reconstructed image further comprise instructions to stitch together the subset of image patches for each color component of the plurality of color components.

14. The electronic device of claim 13, wherein the instructions to generate the reconstructed image further comprise instructions to:
perform a filtering of the stitched subset of image patches for each color component of the plurality of color components; and
perform a color balancing and correction of the stitched subset of image patches for each color component of the plurality of color components.

15. A non-transitory computer-readable medium comprising instructions that, when executed by one or more processors of an electronic device, cause the one or more processors to:

capture, by a camera disposed behind a display panel of the electronic device, an original image through a semi-transparent pixel region of the display panel;

determine a depth position with respect to at least one object identified within the original image;

access, based on the depth position, a plurality of point spread functions (PSFs), each PSF corresponding to a different, specific lateral position of a plurality of lateral positions at the depth position;

generate a set of image patches based on the plurality of PSFs, wherein each image patch of the set of image patches is generated based on a different one of the plurality of PSFs and wherein each image patch is associated with the specific lateral position of the PSF used to generate that image patch; and generate a reconstructed image corresponding to the original image based on the set of image patches.

16. The non-transitory computer-readable medium of claim 15, wherein the instructions to access the plurality of N PSFs further comprise instructions to select, from a memory of the electronic device, a plurality of premeasured PSFs corresponding to the plurality of lateral positions, respectively.

17. The non-transitory computer-readable medium of claim 15, wherein the instructions to determine the depth position with respect to at least one object further comprise instructions to calculate the depth position based on a determined image sensor to camera lens distance of the camera or a determined focal length of the camera.

18. The non-transitory computer-readable medium of claim 15, wherein the instructions to generate the set of N overlapping image patches based on the plurality of PSFs further comprise instructions to generate a subset of image patches for each color component of a plurality of color components.

19. The non-transitory computer-readable medium of claim 18, wherein the instructions to generate the reconstructed image further comprise instructions to deconvolve each image patch of the subset of image patches for each color component of the plurality of color components.

20. The non-transitory computer-readable medium of claim 18, wherein the instructions to generate the reconstructed image further comprise instructions to stitch together the subset of image patches for each color component of the plurality of color components.

* * * * *